US009972185B2

(12) United States Patent
Hutz

(10) Patent No.: US 9,972,185 B2
(45) Date of Patent: May 15, 2018

(54) DIGITAL FINGERPRINT TRACKING

(71) Applicant: Alarm.com Incorporated, Tysons, VA (US)

(72) Inventor: David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days. days.

(21) Appl. No.: 15/344,863

(22) Filed: Nov. 7, 2016

(65) Prior Publication Data
US 2017/0053507 A1 Feb. 23, 2017

Related U.S. Application Data

(62) Division of application No. 14/984,117, filed on Dec. 30, 2015, now Pat. No. 9,536,410.

(Continued)

(51) Int. Cl.
*G08B 13/00* (2006.01)
*G08B 21/02* (2006.01)
(Continued)

(52) U.S. Cl.
CPC ... *G08B 21/0205* (2013.01); *G08B 13/19697* (2013.01); *G08B 21/0225* (2013.01);
(Continued)

(58) Field of Classification Search
CPC ............ G08B 13/2491; G08B 21/0205; G08B 21/0227; G08B 21/0225; G08B 13/19697;
(Continued)

(56) References Cited

U.S. PATENT DOCUMENTS 8,548,489 B2   10/2013 Iwamura
8,620,841 B1 * 12/2013 Filson ................. H04L 12/1895
                                                                                   706/12

(Continued)

OTHER PUBLICATIONS

PCT Notification of Transmittal of the International Search Report and the Written Opinion of the International Searching Authority for International Application No. PCT/US2015/068089 dated Mar. 4, 2016, 15 pages.

(Continued)

*Primary Examiner* — Erin M File
(74) *Attorney, Agent, or Firm* — Fish & Richardson P.C.

(57) ABSTRACT

Techniques are described for tracking intruders of a monitored property by the unique identifying characteristics or "digital fingerprints" of electronic devices carried by the intruders. A system detects an alarm event at a monitored property based on output from at least one sensor located at the monitored property. In response to detecting the alarm event at the monitored property, the system initiates a process to gather electronic identifiers for mobile electronic devices located within the monitored property at a time corresponding to the detected alarm event. The system determines electronic identifiers for the mobile electronic devices located within the monitored property at a time corresponding to the detected alarm event. The system stores in electronic storage, information indicating the determined electronic identifiers for the mobile electronic devices located within the monitored property at a time corresponding to the detected alarm event.

20 Claims, 14 Drawing Sheets

Related U.S. Application Data

(60) Provisional application No. 62/098,282, filed on Dec. 30, 2014.

(51) Int. Cl.
*G08B 13/196* (2006.01)
*H04L 12/64* (2006.01)
*G08B 25/08* (2006.01)

(52) U.S. Cl.
CPC ..... *G08B 21/0227* (2013.01); *G08B 21/0277* (2013.01); *H04L 12/6418* (2013.01); *G08B 13/00* (2013.01); *G08B 25/08* (2013.01)

(58) Field of Classification Search
CPC .... G08B 21/0277; G08B 25/08; G08B 13/00; H04W 8/24; H04L 12/6418
See application file for complete search history.

(56) References Cited

U.S. PATENT DOCUMENTS

| | | | | |
|---|---|---|---|---|
| 2007/0083915 | A1* | 4/2007 | Janakiraman | G06F 21/316 726/4 |
| 2010/0015948 | A1 | 1/2010 | Nagano | |
| 2010/0289644 | A1 | 11/2010 | Slavin | |
| 2012/0092158 | A1* | 4/2012 | Kumbhar | G08B 15/00 340/539.13 |
| 2013/0023247 | A1* | 1/2013 | Bolon | H04W 24/08 455/414.1 |
| 2014/0058567 | A1* | 2/2014 | Matsuoka | G05D 23/1917 700/276 |
| 2014/0169352 | A1* | 6/2014 | Moir | H04W 4/023 370/338 |
| 2014/0171100 | A1* | 6/2014 | Marti | G01S 5/0242 455/456.1 |
| 2014/0266669 | A1* | 9/2014 | Fadell | G05B 19/042 340/501 |
| 2014/0316581 | A1* | 10/2014 | Fadell | F24F 11/0009 700/276 |
| 2015/0134451 | A1* | 5/2015 | Farrar | G06Q 30/0255 705/14.53 |
| 2015/0287306 | A1* | 10/2015 | Hallett | G08B 13/248 340/572.1 |
| 2016/0269984 | A1* | 9/2016 | Hallett | H04W 48/16 |

OTHER PUBLICATIONS

Office Action for U.S. Appl. No. 14/984,117, dated Nov. 7, 2016.
PCT International Preliminary Report on Patentability in International Application No. PCT/US2015/068089, dated Jul. 4, 2017, 11 pages (with English translation).

* cited by examiner

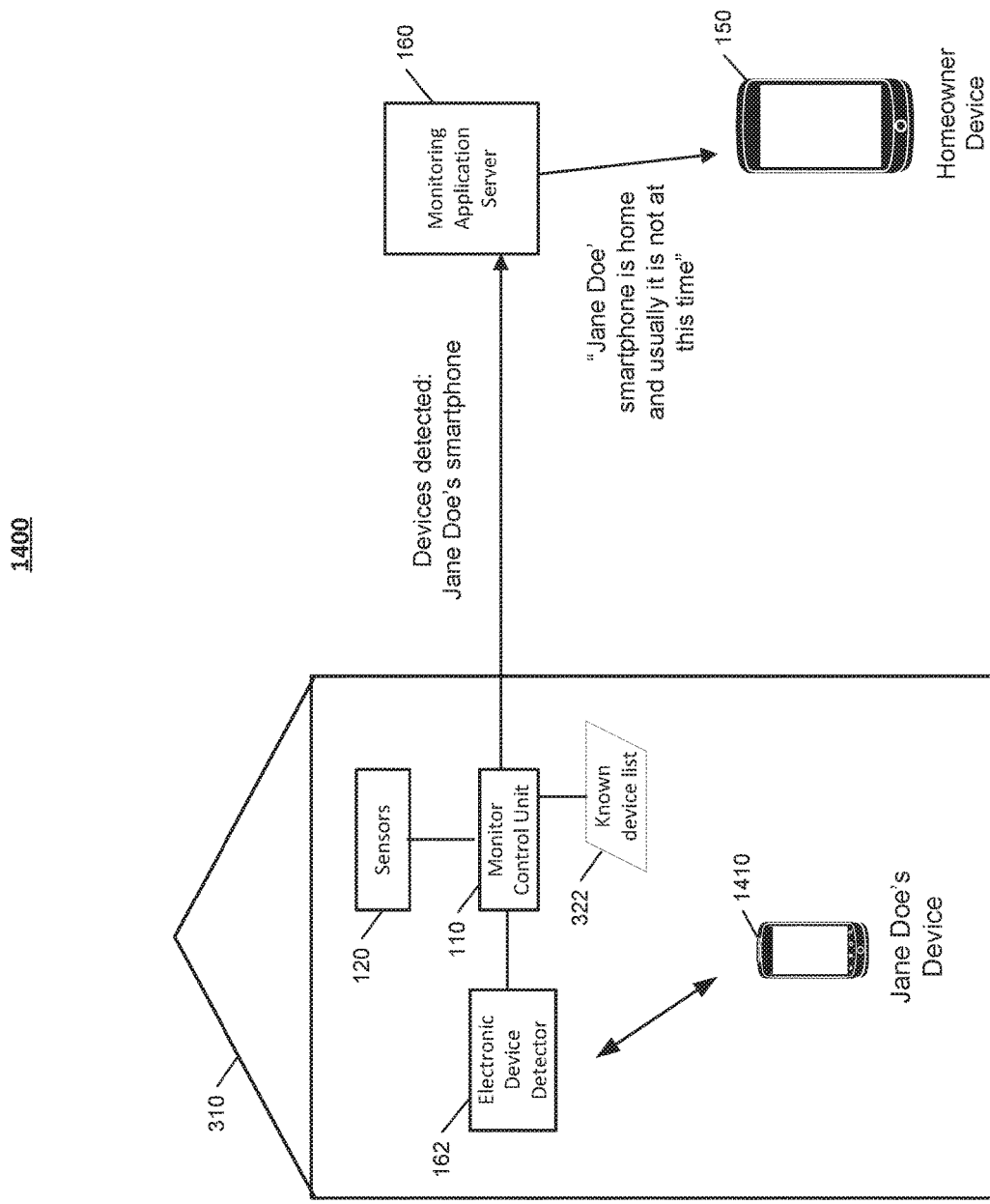

DIGITAL FINGERPRINT TRACKING

CROSS-REFERENCE TO RELATED APPLICATION

This application is a continuation of U.S. patent application Ser. No. 14/984,117, filed Dec. 30, 2015, now U.S. Pat. No. 9,536,410, which claims the benefit of U.S. Provisional Application No. 62/098,282, filed Dec. 30, 2014. The prior applications are incorporated herein by reference in their entirety.

TECHNICAL FIELD

This disclosure relates to security systems.

BACKGROUND

Many people equip homes and businesses with alarm systems to provide increased security for their homes and businesses. Law enforcement may utilize video recording data retrieved from cameras within homes and businesses monitored by alarm systems as evidence when prosecuting accused perpetrators.

SUMMARY

Techniques are described for tracking intruders of a monitored property by the unique identifying characteristics or "digital fingerprints" of electronic devices carried by the intruders.

Implementations of the described techniques may include hardware, a method or process implemented at least partially in hardware, or a computer-readable storage medium encoded with executable instructions that, when executed by a processor, perform operations.

The operations may include detecting an alarm event at a monitored property based on output from at least one sensor located at the monitored property and in response to detecting the alarm event at the monitored property, initiating a process to gather electronic identifiers for mobile electronic devices located within the monitored property at a time corresponding to the detected alarm event. Additional operations may include, based on the process to gather electronic identifiers for mobile electronic devices located within the monitored property at a time of the detected alarm event, determining electronic identifiers for the mobile electronic devices located within the monitored property at a time corresponding to the detected alarm event and storing, in electronic storage, information indicating the determined electronic identifiers for the mobile electronic devices located within the monitored property at a time corresponding to the detected alarm event.

Implementations may include one or more of the following features. For example, determining electronic identifiers for the mobile electronic devices located within the monitored property at a time corresponding to the detected alarm event may include transmitting, by a device detector located at the monitored property and through a wireless communication protocol, a request for responses from mobile electronic devices at the monitored property, where each response includes the electronic identifier for the mobile electronic device that received the request. In another example, determining electronic identifiers for the mobile electronic devices located within the monitored property at a time corresponding to the detected alarm event may include accessing stored information indicating electronic identifiers for mobile electronic devices detected within the monitored property before the alarm event was detected. In yet another example, the electronic identifiers include media access control (MAC) addresses. In still another example, detecting an alarm event at a monitored property based on output from at least one sensor located at the monitored property may include detecting a security breach at the monitored property based on output from a door sensor that indicates a door is opened when a security system is armed. In another instance, operations may include determining, from among multiple types of alarm events, a type of the detected alarm event, based on the determined type of the detected alarm event, selecting, from among multiple electronic device detection procedures, an electronic device detection procedure appropriate for the determined type of the detected alarm event, and executing the selected electronic device detection procedure.

In yet another instance, the type of the detected alarm event may include a fire event and the electronic device detection procedures includes determining known mobile electronic devices within the monitored property and providing an alert that indicates the known mobile electronic devices determined to be within the monitored property. In still another instance, the type of the detected alarm event includes a security breach event and the electronic device detection procedures includes determining unknown mobile electronic devices within the monitored property and providing an alert that indicates the unknown mobile electronic devices determined to be within the monitored property. In another example, the process to gather electronic identifiers for mobile electronic devices located within the monitored property at a time corresponding to the detected alarm event includes determining a location, within the monitored property, that is associated with the alarm event, identifying a device detector located closest or within a threshold distance of the location that is associated with the alarm event, triggering the identified device detector to transmit a request for responses from mobile electronic devices at the monitored property, receiving the responses from the mobile electronic devices at the monitored property, and extracting, from each response, an electronic identifier for the mobile electronic device that provided the response. In yet another example, the operations include evaluating the determined electronic identifiers for the mobile electronic devices located within the monitored property at a time corresponding to the detected alarm event against one or more rules, based on the evaluation, determining an alarm response for the alarm event that is appropriate for the mobile electronic devices located within the monitored property at a time corresponding to the detected alarm event, and handling the detected alarm event based on the determined alarm response for the alarm event that is appropriate for the mobile electronic devices located within the monitored property at a time corresponding to the detected alarm event. In still another example, determining an alarm response for the alarm event that is appropriate for the mobile electronic devices located within the monitored property at a time corresponding to the detected alarm event includes in response to determining the mobile electronic devices include an unknown mobile electronic device, determining an alarm response corresponding to detection of an unknown mobile electronic device. In another example, the operations include determining that an electronic identifier received corresponds to an electronic identifier of a mobile electronic device known for the monitored property, identifying a user associated with the mobile electronic device known for the monitored property, identifying an alarm response corresponding to the user associated with the mobile electronic device known for the monitored property, and triggering the identified alarm response corresponding to the user associated with the mobile electronic device known for the monitored property.

The details of one or more implementations are set forth in the accompanying drawings and the description below. Other features will be apparent from the description and drawings, and from the claims.

DESCRIPTION OF DRAWINGS

FIGS. 1, 3, 5, 7, 9, 11, 13, and 14 illustrate example systems.

DETAILED DESCRIPTION

Techniques are described for tracking intruders of a monitored property by the unique identifying characteristics or "digital fingerprints" of their electronic devices. The monitoring system at a monitored property may detect an alarm event, and based on the detection of the alarm event, may attempt to collect and record information about electronic devices that are within the monitored property during the detected alarm event. Electronic devices have one or more identifying characteristics that are unique to each device. The monitoring system may record any identifying characteristics of the devices within the monitored property during the alarm event. The monitoring system may also record any electronic transmissions that originate from, or are transferred to, the electronic devices within the monitored property. The recorded identifying characteristics and electronic transmissions may be used to identify the devices that were present during the alarm event at the monitored property and this information may potentially be used to identify an intruder.

Figure 1:
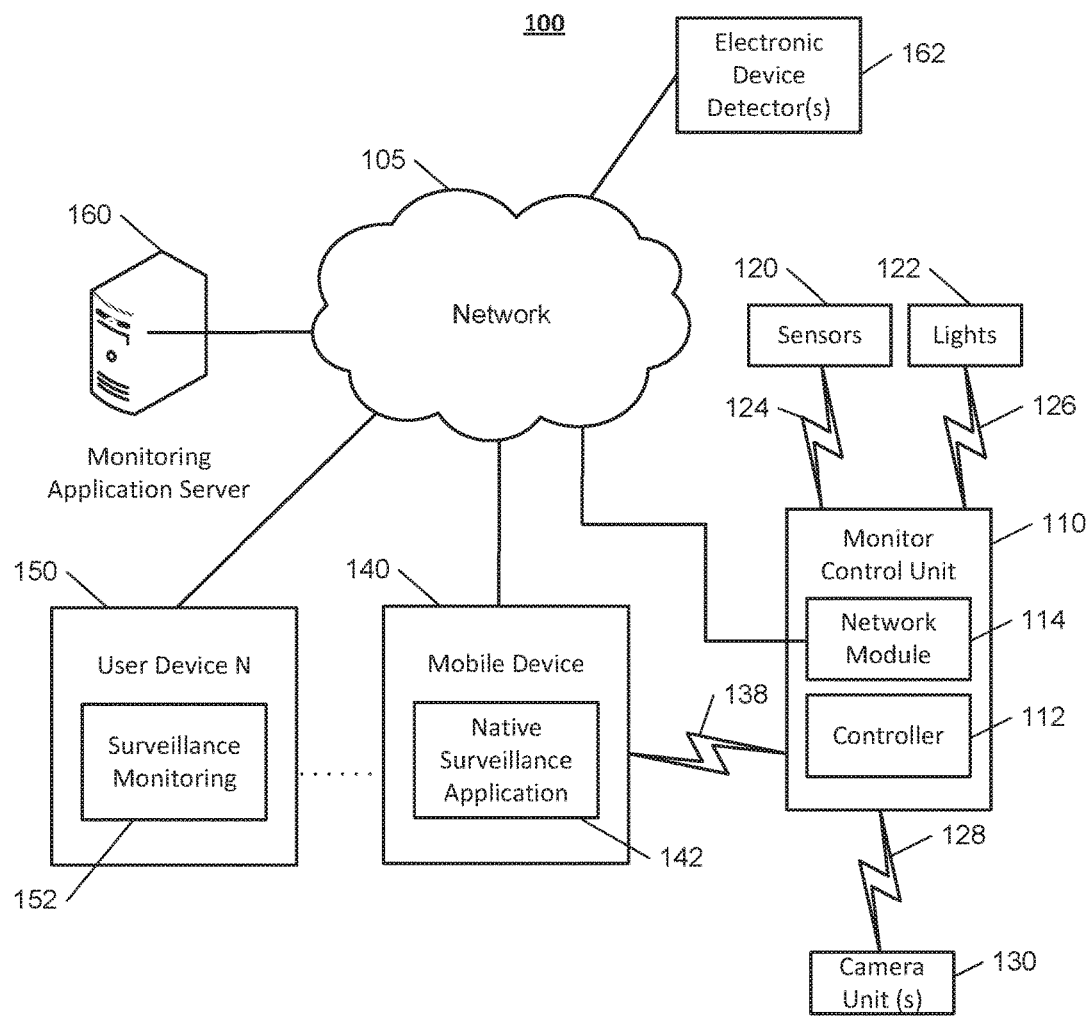

FIG. 1 illustrates an example of an electronic system 100 configured to provide surveillance and reporting of a monitored property. The electronic system 100 includes a network 105, a monitor control unit 110, one or more user devices 140, 150, a monitoring application server 160, and one or more electronic device detector(s) 162. In some examples, the network 105 facilitates communications between the monitor control unit 110, the one or more user devices 140, 150, the monitoring application server 160, and the one or more electronic device detector(s) 162.

The network 105 is configured to enable exchange of electronic communications between devices connected to the network 105. For example, the network 105 may be configured to enable exchange of electronic communications between the monitor control unit 110, the one or more user devices 140, 150, the monitoring application server 160, and the one or more electronic device detector(s) 162. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or sub-networks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller 112 and a network module 114. The controller 112 is configured to control a monitoring system (e.g., a home alarm or security system) that includes the monitor control unit 110. In some examples, the controller 112 may include a processor, or other control circuitry, configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitor control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The one or more electronic device detectors 162 are electronic devices that are configured to identify unique characteristics of electronic devices within the monitored property. The one or more electronic device detectors may be one or more electronic devices that are capable of communicating with other electronic devices by various wireless protocols, such as wifi, Bluetooth, Bluetooth LE, zwave, zigbee, RFID, Near Field Communication, or another short-range wireless communication protocol. For example, an electronic device detector may be a digital video recorder (DVR) with Bluetooth capability. The DVR may attempt to communicate with electronic devices that are within the DVR's Bluetooth range and have Bluetooth capability. In some implementations, the one or more electronic device detectors 162 are standalone devices that detect characteristics of electronic devices and communicate with one or more components of the monitoring system. In addition, the one or more electronic device detectors 162 may be included in one or more components of the monitoring system. For instance, the monitor control unit 110 may be able to communicate over a short-range wireless communication protocol (e.g., Wi-Fi or Bluetooth LE) and may serve as one of the one or more electronic device detectors 162.

The monitoring system may include one or more sensors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. Some of the sensors may be configured to detect electronic devices within the monitored property, and in these examples, the sensors may function as electronic device detectors. The sensors may communicate with the electronic devices and may retrieve unique identifying information from the electronic devices when communication is established between the electronic device and the sensor. The sensors 120 may also include Wi-Fi sensors, Bluetooth sensors, RFID sensors, etc.

The monitor control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitor control unit 110. The sensors 120, the module 122, and the camera 130 communicate with the controller 112 over communication links 124, 126, and 128. The communication links 124, 126, and 128 may include a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value. The communication link 128 over which the camera 130 and the controller 112 communicate may include a local network. The camera 130 and the controller 112 may exchange images and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitor control unit 110, and the one or more user devices 140, 150 over the network 105. For example, the monitoring application server 160 may be configured to monitor events (e.g., alarm events) generated by the monitor control unit 110. In this example, the monitoring application server 160 may exchange electronic communications with the network module 114 included in the monitor control unit 110 to receive information regarding events (e.g., alarm events) detected by the monitor control unit 110. The monitoring application server 160 also may receive information regarding events (e.g., alarm events) from the one or more user devices 140, 150.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive notifications and electronic device information from the monitoring system.

The user device 150 may be a general-purpose computer (e.g., a desktop personal computer, a workstation, or a laptop computer) that is configured to communicate with the monitoring application server 160 and/or the monitor control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 1 illustrates two user devices for brevity, actual implementations may include more (and, perhaps, many more) or fewer user devices.

In some implementations, the one or more user devices 140, 150 communicate with and receive monitoring system data from the monitor control unit 110 using the communication link 138. For instance, the one or more user devices 140, 150 may communicate with the monitor control unit 110 using various local wireless protocols such as Wi-Fi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

In some implementations, the monitoring system may be configured to detect one or more electronic devices within the monitored property during an alarm event. The monitor control unit 110 may detect an alarm event at the monitored property. The monitor control unit 110 may then trigger the one or more electronic device detectors 162 to attempt to communicate with any electronic devices within the monitored property. For example, the monitor control unit 110 may detect a security breach, and based on the detection of the security breach, the monitor control unit 110 may trigger the one or more electronic device detectors to attempt to communicate with any electronic devices within the monitored property.

In some implementations, the monitor control unit 110 may determine whether to trigger the one or more electronic device detectors based on the type of alarm event. For example, the monitor control unit 110 may determine not to trigger the one or more electronic devices when the alarm event is a fire alarm event. The monitor control unit 110 may determine a subset of one or more electronic device detectors 162 within the monitored property that should be triggered based on the location of the security breach. For example, the monitor control unit 110 may determine to trigger the one or more electronic detectors that are within a pre-determined distance from the one or more sensors that triggered the alarm event.

In some implementations, the monitoring system may be configured to capture video recordings of the monitored property during an alarm event. The monitor control unit 110 may detect an alarm event at the monitored property, and may trigger one or more camera units 130 to begin capturing video recordings of the area surrounding the one or more cameras. For example, an intruder may enter a monitored property and trigger a security breach alarm event. In this example, the monitor control unit 110 may trigger the one or more electronic device detectors to attempt to communicate with the electronic devices within the monitored property, and simultaneously, trigger the one or more camera units to record video of the monitored property. The monitor control unit 110 may trigger the one or more camera units that are within a pre-determined distance from the one or more sensors that triggered the alarm event to capture video recording data. In addition, the monitor control unit 110 may trigger the one or more camera units that are within a pre-determined distance from the one or more electronic device detectors 162 that have detected an electronic device to capture video recording data. In some examples, the monitor control unit 110 may trigger the one or more camera units to capture still images of the monitored property.

In some implementations, the one or more electronic device detectors may be electronic devices configured to communicate with other electronic devices. In these implementations, each of the one or more electronic devices may be configured to communicate with other electronic devices by a type of electronic signal. For example, a wireless router may be configured to communicate with Wi-Fi enabled electronic devices within the monitored property, and a DVR may be configured to communicate with Bluetooth enabled devices within the monitored property. In some implementations, the sensors 120 may act as electronic device detectors. The one or more sensors may have the ability to communicate through one or more different wireless protocols. For example, the one or more sensors may be configured to communicate through Wi-Fi, Bluetooth, radio frequency signals, or any other suitable electronic communication protocol. The monitored property may be equipped with a plurality of electronic sensors that are mounted throughout the property. The monitor control unit 110 may communicate with the one or more electronic device detectors 162 over the network 105. In some examples, where the sensors act as electronic device detectors, the monitor control unit 110 may communicate via the communication link 124.

In some implementations, an alarm event may be triggered by an intruder entering the monitored property. For example, an intruder may enter a monitored property and trigger a security breach alarm event. The security breach alarm event may be triggered by a sensor detecting an intruder at the monitored property. The intruder may have one or more electronic devices in his/her possession on entry to the monitored property. For example, the intruder may have in his/her possession, a smart phone, a wearable sports band, a car key fob, an RFID fob, or other type of electronic device that communicates wirelessly and has identifying characteristics. The monitor control unit 110 of the monitoring system may trigger the one or more electronic device detectors 162 to attempt to communicate with any electronic devices within the monitored property. The monitor control unit 110 may store a list of known electronic devices in its memory. The list of known electronic devices may include the one or more electronic devices 140, 150 that are associated with the monitored property. The list of known electronic devices may include the electronic devices maintained within the property, for example, a wireless router, a DVR, a desktop computer, a laptop computer, a tablet computer, an Internet television receiver, a game console, a Bluetooth radio, etc. The list of known devices also may include other electronic devices associated with users of the monitored property, such as smart phones, sport bands, car key fobs, etc. The list of known devices may include the one or more electronic device detectors within the monitored property and the one or more other electronic devices or components of the monitoring system. The list of known electronic devices associated with the monitored property may include the name of the device, the manufacturer's identification number, and any electronic data that is specific to each device. In some examples, the list of known electronic devices associated with a monitored property may be maintained on a server or in cloud storage.

In some implementations, the list of known electronic devices may be modified by an authorized user associated with the monitored property. The authorized user may have the ability to identify an electronic device as known or unknown. The authorized user may access the surveillance application on his or her mobile device and may indicate whether a device should be considered as known or unknown. In some implementations, the monitoring system may monitor the electronic devices that connect to the Wi-Fi network within the monitored property to determine whether a device is known or unknown. In these implementations, the authorized user may receive a notification from the monitor control unit 110 enquiring whether an identified device should be registered as a known device or not. The authorized user may respond to the notification, and the list of known devices can be updated based on the authorized user response. For example, a friend of a user may visit the monitored property and join the Wi-Fi network on his/her smart phone. In this case, the authorized user may receive a notification asking whether the friend's smart phone should be added to the list of known electronic devices, and based on the authorized user's approval, the smart phone device may be added to the list. In some implementations, the list of known devices is automatically updated by the monitoring system. The monitor control unit 110 may remove devices from the known electronic device list if the electronic device has not connected to the Wi-Fi network of the monitored property within a user set time period. For example, the monitor control unit 110 may remove devices from the list of known electronic devices if the device has not connected to the Wi-Fi network of the monitored property within the past two weeks. In some implementations, the list of known electronic devices may be restricted to devices used and owned by users of the monitored property.

In some implementations, when the monitor control unit 110 triggers the one or more electronic device detectors to attempt to communicate with the one or more electronic devices within the monitored property, the one or more electronic device detectors do not attempt to communicate with any electronic device that is maintained on the list of known electronic devices. The one or more electronic device detectors may attempt to communicate with any electronic devices that are within the monitored property and are not on the list of known electronic devices.

In some implementations, the intruder may enter the monitored property with a Wi-Fi enabled electronic device, for example, a smart phone, a Wi-Fi communicator, an iPod, Nike sports band, or a Wi-Fi radio, etc. The monitor control unit 110 of the monitoring system may trigger the one or more electronic device detectors to attempt to communicate with any electronic devices within the monitored property. At least one of the one or more electronic device detectors may be a Wi-Fi enabled device that is configured to be treated as a trusted Wi-Fi network by electronic devices within its Wi-Fi network zone. This electronic device detector may include software that is configured to spoof the Service Set Identifier (SSID) of the trusted wireless networks that are saved to an electronic device. When the intruder's Wi-Fi enabled electronic device enters the monitored property and into the range of the Wi-Fi network, the Wi-Fi enabled electronic device automatically attempts to communicate with the available Wi-Fi network. The Wi-Fi enabled electronic device will connect to the Wi-Fi network when the electronic device detector mimics the SSID of one of the known Wi-Fi networks already saved on the intruder's Wi-Fi enabled electronic device. For example, the intruder may enter the monitored property with a Wi-Fi enabled smart phone. The electronic device detector may initiate communication with the intruder's smart phone, receive a unique identifier or MAC address of the intruder's smart phone, and store the unique identifier or MAC address of the intruder's smart phone. The electronic device detector also may retrieve and store all the data that is communicated between the Wi-Fi network and the intruder's Wi-Fi enabled electronic device. The unique identifier and the data communicated may be stored at the electronic device detector, or may be stored on a server or in cloud storage associated with the monitored property. The intruder's Wi-Fi enabled electronic device will remain connected to the network until the device moves out of the range of the network.

In some implementations, the monitored property may include a security panel, the security panel may be used by the user to arm and disarm the security system within the monitored property. The security panel may be a Wi-Fi enabled electronic device and may act as an electronic device detector for Wi-Fi enabled electronic devices.

In some implementations, the intruder may enter the monitored property with a Bluetooth enabled electronic device, for example, a smart phone, a Bluetooth radio, a head set, etc. The monitor control unit 110 may trigger the one or more electronic device detectors to attempt to communicate with any electronic devices within the monitored property. At least one of the one or more electronic device detectors may be a Bluetooth enabled device. When the intruder enters the monitored property and the intruder's Bluetooth enabled electronic device enters the range of a Bluetooth enabled electronic device detector, the electronic device detector sends out radio signals requesting a response from the electronic devices within its range, including the intruder's Bluetooth enabled electronic device. The electronic device detector may include software that is configured to automate the cloning of a Bluetooth device name, class, and/or address that is saved to a Bluetooth capable electronic device. The electronic device detector may send radio signals to the intruder's Bluetooth enabled electronic device, and the intruder's device may connect automatically to the cloned Bluetooth connection. The electronic device detector software may also be configured to clone the identifying information of the intruder's electronic device, such as the Bluetooth MAC address. The electronic device detector may store the device information and any information that is exchanged over the Bluetooth connection as long as the Bluetooth enabled device is within the range of the Bluetooth network.

In some implementations, the monitored property may be equipped with one or more electronic device detectors and each electronic device detector may be configured to communicate through one type of wireless protocol. For example, a wireless router that acts as an electronic device detector may be configured to only communicate with Wi-Fi enabled electronic devices. For example, the monitored property may include one or more sensors that act as electronic device detectors. In this example, a subset of the sensors are configured to communicate with RFID devices, a second subset of the sensors are configured to communicate with Wi-Fi enabled devices, and a third subset is configured to communicate with Bluetooth enabled devices.

In some implementations, the one or more electronic device detectors are configured to communicate through more than one type of wireless protocol. For example, the one or more electronic device detectors may be configured to communicate with both Wi-Fi and Bluetooth enabled devices. The one or more electronic device detectors may be configured to attempt to communicate with the electronic devices within the monitored property using one type of wireless protocol at a time. In these implementations, the one or more electronic device detectors may attempt to communicate with the electronic devices based on a wireless protocol ranked list. For example, the one or more electronic device detectors may attempt to communicate via Bluetooth first, then Wi-Fi communication, then radio frequency, then infrared, and so on. In some examples, the one or more electronic detectors may attempt to communicate with the electronic devices within the monitored property via Wi-Fi communication first. The one or more electronic device detectors may attempt to communicate with one or more unknown devices until identifying data unique to the unknown devices are obtained. For example, the one or more electronic device detectors may attempt to communicate with an unknown device by Bluetooth, and, if the unknown device is not Bluetooth enabled, no identifying information would be gathered from the unknown device. The one or more electronic device detectors may then attempt to communicate with the unknown device by Wi-Fi, and, if the electronic device is Wi-Fi enabled, it may join the Wi-Fi connection. The unique identifying information from the unknown electronic device may be stored on a server or in cloud storage associated with the monitored property.

In some implementations, the monitor control unit 110 may detect an alarm event, for example, a security breach event. The monitor control unit 110 may send a notification to the mobile device of an authorized user associated with the monitored property. The notification may include a request for the monitor control unit to trigger the electronic device detectors to start attempting to communicate with the one or more electronic devices within the monitored property. The authorized user may respond to the request, and based on the user's response, the monitor control unit may trigger the electronic device detectors to start attempting to retrieve identifying information from the electronic devices within the monitored property. In some examples, the monitor control unit 110 may trigger the electronic device detectors to start retrieving identifying information when a response to the notification is not received within a set time period. For example, the monitor control unit 110 may trigger the electronic devices to start retrieving information if a response is not received within two minutes. The set time period for response to the notification may be a user set time period. An authorized user may access the native surveillance application from a mobile device to set the time period for response to the notification.

In some implementations, the one or more electronic device detectors at the monitoring property are constantly retrieving identifying information from electronic devices within the monitored property. In these implementations, the one or more electronic device detectors may be constantly attempting to communicate with electronic devices within the monitored property. The electronic device detectors may generate a list of known electronic devices associated with the monitored property and may have the list maintained in its memory. The list of known electronic devices may also include any identifying data that is unique to the electronic device. The list of known electronic devices may include the electronic devices maintained within the property, for example, a wireless router, a DVR, a desktop computer, a laptop computer, a tablet computer, an Internet television receiver, a game console, a Bluetooth radio, etc. The list of known devices may also include other electronic devices associated with users of the monitored property, such as smart phones, sport bands, car key fobs, etc. The list of known electronic devices may be maintained on a server or in cloud storage associated with the monitoring system.

In some examples, the one or more electronic device detectors 162 passively monitor for information from electronic devices located within the property. In these examples, the one or more electronic device detectors 162 listen for communications originating from electronic devices located within the property and record any useful information from communications received as part of the listening. The useful information may include any type of information that assists in identifying the electronic device that originated the communication.

In some implementations, the one or more electronic device detectors 162 actively request information from electronic devices located within the property. In these implementations, the one or more electronic device detectors 162 initiate communications to electronic devices located within the property and attempt to get electronic devices located within the property to respond. For instance, the one or more electronic device detectors 162 may send requests to establish a communication session with other electronic devices and then monitor for responses to the requests. The requests may be broadcasts of availability of a network (e.g., a Wi-Fi network) or invitations to establish a direct connection (e.g., a Bluetooth pairing request). The one or more electronic device detectors 162 may analyze and store information received in response to the request in an attempt to obtain identifying information for the device responding to the request. If no identifying information is received, the one or more electronic device detectors 162 may actively send additional requests for identifying information from the detected electronic devices.

Although the one or more electronic device detectors 162 may be triggered in response to an alarm event as described above, the one or more electronic device detectors 162 also may be configured to continuously (or periodically) track identifying information or "digital fingerprints" of devices located within the property. In this regard, the one or more electronic device detectors 162 may passively or actively monitor for electronic devices and record any identifying information received from detected devices in a log. The monitor control unit 110 may send the data in the log to the monitoring application server 160 in response to an alarm event or request by a user.

In some implementations, a log of electronic device information may be analyzed to determine certain information about the monitored property. For instance, the log of electronic device information may be compared against electronic device identifiers detected during an alarm event in an attempt to determine whether the electronic devices detected during the alarm event have been in the monitored property previously and when they were in the monitored property. If the comparison reveals that one or more of the electronic devices detected during the alarm event were previously in the property, a report may be generated to show when the one or more electronic devices were in the property, which may be useful in identifying an intruder.

In some examples, the log of electronic device information may be used for alerting during monitoring electronic devices that enter the property. In these examples, electronic devices that have entered the property may be compared against the log to determine whether the electronic devices have been present before in a legitimate capacity. If not, an alert may be provided to a user. For instance, the user may contract a maid service to clean his or her home. In this instance, when the typical set of maids enters the property to clean, an alert is not provided because the log would include the electronic devices used by the typical set of maids during a past cleaning. However, if a new maid or a different set of maids enters the property, the user may be alerted because the electronic devices of the new maid or the different set of maids are new to the property. In this regard, the user may be alerted to a new individual in his or her home and may take any action the user deems appropriate.

In addition, the log may be used to provide information to the user about the individuals in the property. For example, the log may be used to report to the user the number of devices at the property (e.g., number of unknown devices). In this example, the user may determine whether unauthorized use of the property is taking place, such as a child throwing an unauthorized party at the property reflected by a relatively large number of electronic devices at the property. Also, the log may be used to indicate which user devices are at the property at a given time. For instance, the user may request information on who is currently at the property and the log may be consulted to detect which of the known mobile devices are located in the property (e.g., dad and son are home, daughter is not home).

FIGS. 2, 4, 6, 8, 10, and 12 illustrate flowcharts of example processes. The operations of the example processes are described generally as being performed by the system 100. The operations of the example processes may be performed by one of the components of the system 100 (e.g., the monitor control unit 110, the monitoring application server 160, etc.) or may be performed by any combination of the components of the system 100. In some implementations, operations of the example processes may be performed by one or more processors included in one or more electronic devices.

Figure 2:
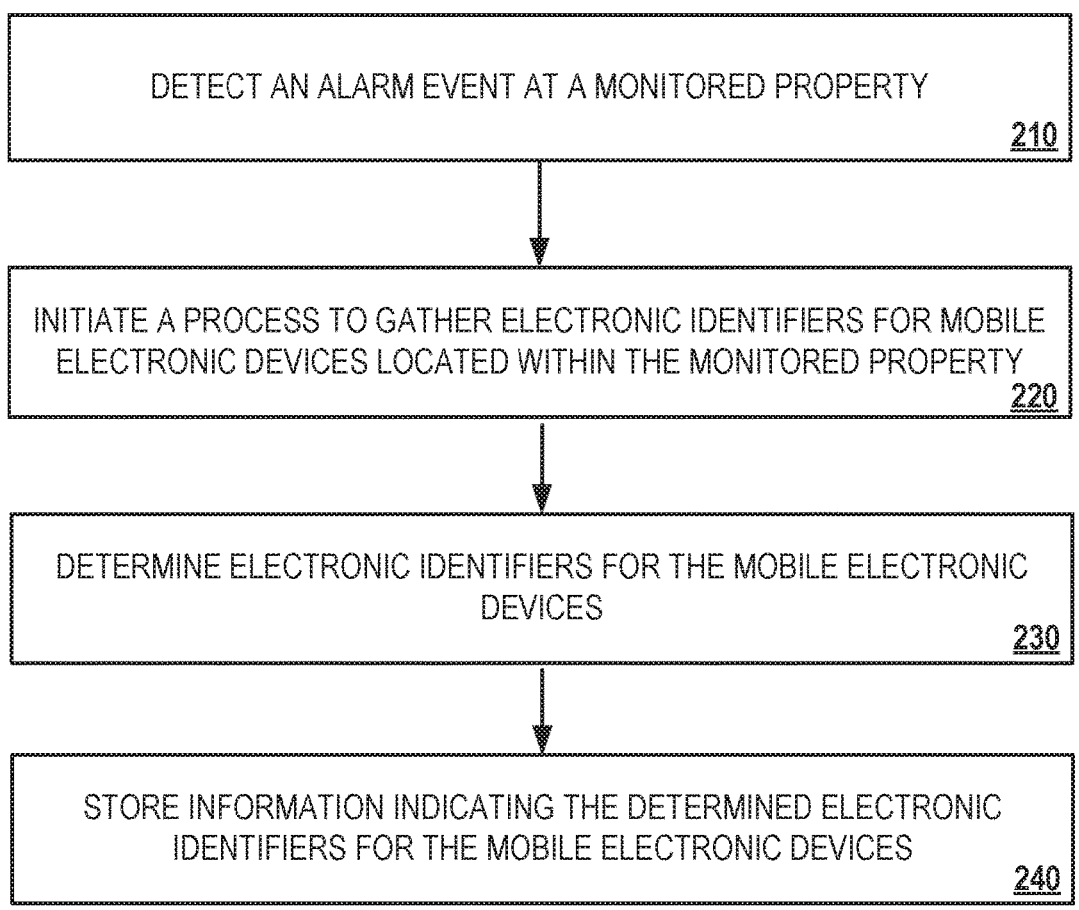
FIGS. 2, 4, 6, 8, 10, and 12 illustrate flowcharts of example processes.

FIG. 2 illustrates an example process 200 for storing information indicating electronic identifiers for mobile electronic devices determined to be in a monitored property. The system 100 detects an alarm event at a monitored property (210). The system 100 may detect the alarm event based on output from at least one sensor located at the monitored property. For example, the monitor control unit 110 may determine that an alarm event type of security breach has occurred because the security system was set to armed, a door sensor provided an output to the monitor control unit 110 indicating that a door was opened, and the security system was not disarmed within one minute of the door opening. In another example, the monitor control unit 110 may determine that a fire alarm event has been detected based on determining that a smoke sensor has provided an output to the monitor control unit 110 that indicates that a level of smoke is above a threshold corresponding with a fire within the monitored property.

In response to detecting the alarm event at the monitored property, the system 100 initiates a process to gather electronic identifiers for mobile electronic devices located within the monitored property at a time corresponding to the detected alarm event (220). For example, in response to detecting an alarm event, the monitor control unit 110 may instruct the electronic device detector 162 to wirelessly broadcast a request for electronic identifiers from all mobile electronic devices within the monitored property. As described above in relation to FIG. 1, the electronic device detector 162 may use various wireless protocols, such as wifi, Bluetooth, Bluetooth LE, zwave, zigbee, RFID, Near Field Communication, or another short-range wireless communication protocol to request electronic identifiers, and may spoof a trusted wireless network or trusted device so that electronic devices within the property may identify themselves. In some implementations, the monitoring application server 160 may provide updates regarding trusted networks or trusted devices that the electronic device detector 162 may spoof using the updates.

Additionally or alternatively, in initiating a process to gather electronic identifiers, the monitor control unit 110 may send a notification to the mobile device of an authorized user associated with the monitored property. The notification may include a request for the monitor control unit to trigger the electronic device detectors to start attempting to communicate with the one or more electronic devices within the monitored property. The authorized user may respond to the request, and based on the user's response, the monitor control unit may trigger the electronic device detectors to start attempting to retrieve identifying information from the electronic devices within the monitored property. In some examples, the monitor control unit 110 may trigger the electronic device detectors to start retrieving identifying information when a response to the notification is not received within a set time period. For example, the monitor control unit 110 may trigger the electronic devices to start retrieving information if a response is not received within two minutes. The set time period for response to the notification may be a user set time period. An authorized user may access the native surveillance application from a mobile device to set the time period for response to the notification.

In another example, the one or more electronic device detectors at the monitoring property may constantly retrieve identifying information from electronic devices within the monitored property and in response to detecting an alarm event, the monitor control unit 110 may access a pre-existing log of electronic identifiers detected within the monitored property or a most recent list of electronic identifiers detected within the monitored property. The monitor control unit 110 may access a log of electronic identifiers for mobile electronic devices detected within the monitored property and select a subset of the electronic identifiers based on a time corresponding to the detected alarm event, e.g., selecting the electronic identifiers that were detected in response to most recent request for electronic identifiers or selecting the electronic identifiers that were detected within the last five minutes, selecting the electronic identifiers that were detected within the past thirty minutes, etc.

The system 100 determines electronic identifiers for the mobile electronic devices located within the monitored property (230). For example, the monitor control unit 110 may receive responses from mobile electronic devices located within the monitored property, where the response from each mobile electronic device includes an electronic identifier for the mobile electronic device, and may extract the electronic identifiers for the mobile electronic devices from the responses. In another example, the monitor control unit 110 may determine the electronic identifiers, from the log of electronic identifiers for mobile electronic devices previously detected within the monitored property, for mobile electronic devices detected in the monitored property at a time that correspond to the detected alarm event.

The system 100 stores information indicating the determined electronic identifiers for the mobile electronic devices (240). For example, the monitor control unit 110 may generate a report that indicates electronic identifiers for mobile electronic devices located within the monitored property at a time corresponding to the detected alarm event. The report may indicate the type of alarm event and the electronic identifiers. In another example, the monitor control unit 110 may add the determined electronic identifiers for the mobile electronic devices detected within the monitored property to the log of electronic identifiers.

Figure 3:
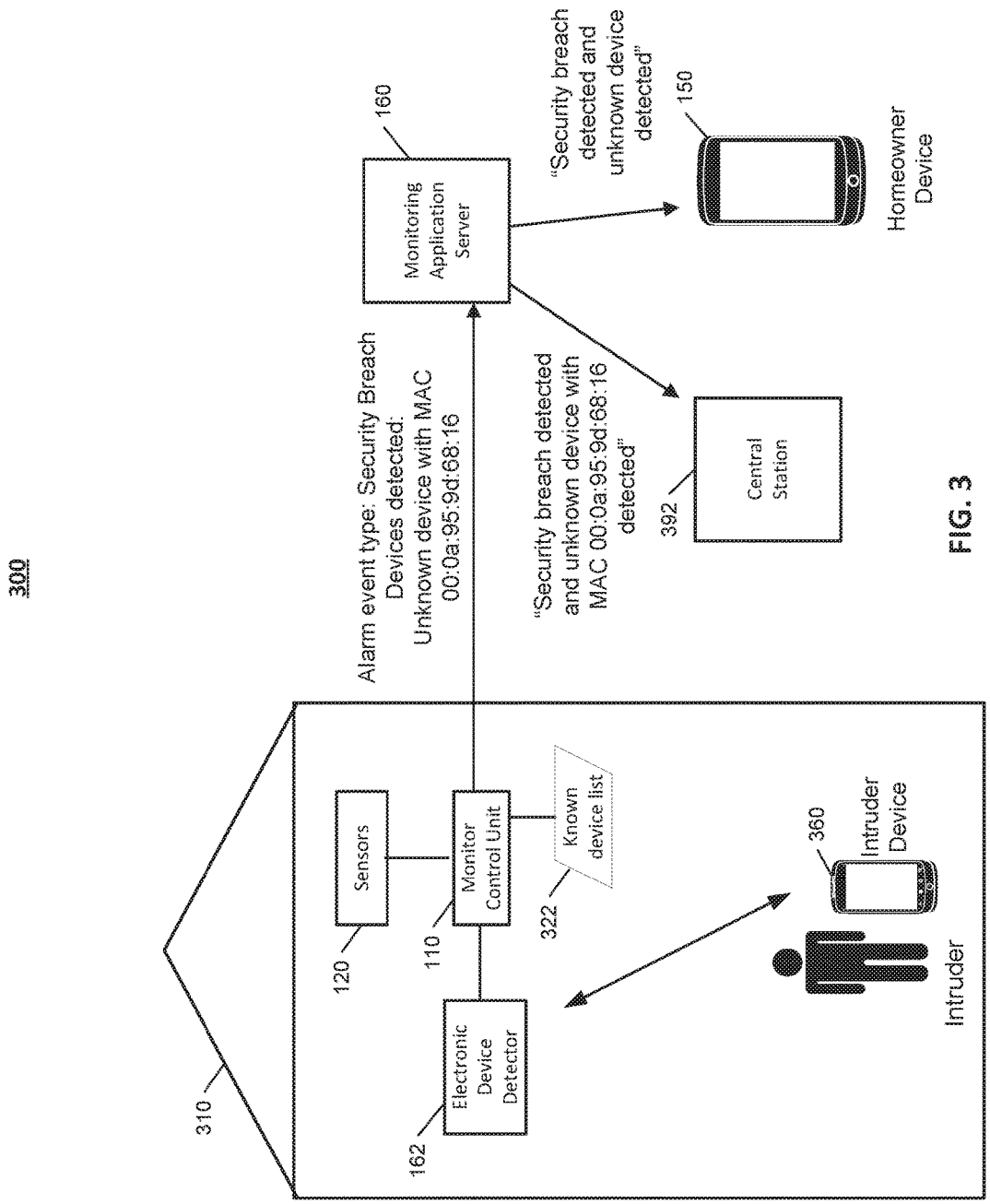

FIG. 3 illustrates an example system 300 for storing information indicating electronic identifiers for mobile electronic devices located within a monitored property 310. The monitor control unit 110 may receive one or more outputs from the sensors 120 in the monitored property 310 and in response, detect an alarm event. For example, the monitor control unit 110 may receive an output from a window sensor that indicates that a window was opened, receive an output from a motion sensor near the window that indicates that motion was detected within the monitored property 310, determine that the security system is armed, and in response, determine that an alarm event type of security breach is detected.

In response to detecting the alarm event, the monitor control unit 110 may initiate a process to gather electronic identifiers for mobile electronic devices located within the monitored property at a time corresponding to the detected alarm event. For example, the monitor control unit 110 may instruct the electronic device detector 162 to transmit a request for electronic identifiers of all mobile electronic devices located within the monitored property, and an intruder device 360, e.g., a mobile electronic device of an intruder, may receive the request. In another example, additionally or alternatively, the monitor control unit 110 may access a pre-existing log of electronic identifiers detected within the monitored property or a most recent list of electronic identifiers detected within the monitored property.

The monitor control unit 110 may determine electronic identifiers for the mobile electronic devices located within the monitored property at a time corresponding to the detected alarm event. For example, the monitor control unit 110 may receive, from the electronic device detector 162, the response from the intruder device 360 and extract an electronic identifier for the intruder device 360. In another example, the electronic device detector 162 may receive the response from the intruder device 360, extract the electronic identifier from the response, and provide the electronic identifier to the monitor control unit 110.

The monitor control unit 110 may store information indicating the determined electronic identifiers for the mobile electronic devices. For example, the monitor control unit 110 may generate a report that indicates "Alarm event type: Security Breach; Devices detected: Unknown device with MAC 00:0a:95:9d:68:16" and provide the report to a monitoring application server 160. In some implementations, the report may indicate when the device was first detected in the monitored property. The monitoring application server 160 may then provide the report to a central server 392 that may dispatch security personnel to the monitored property 310 and provide the report to a homeowner device, e.g., the user device 150.

Figure 4:
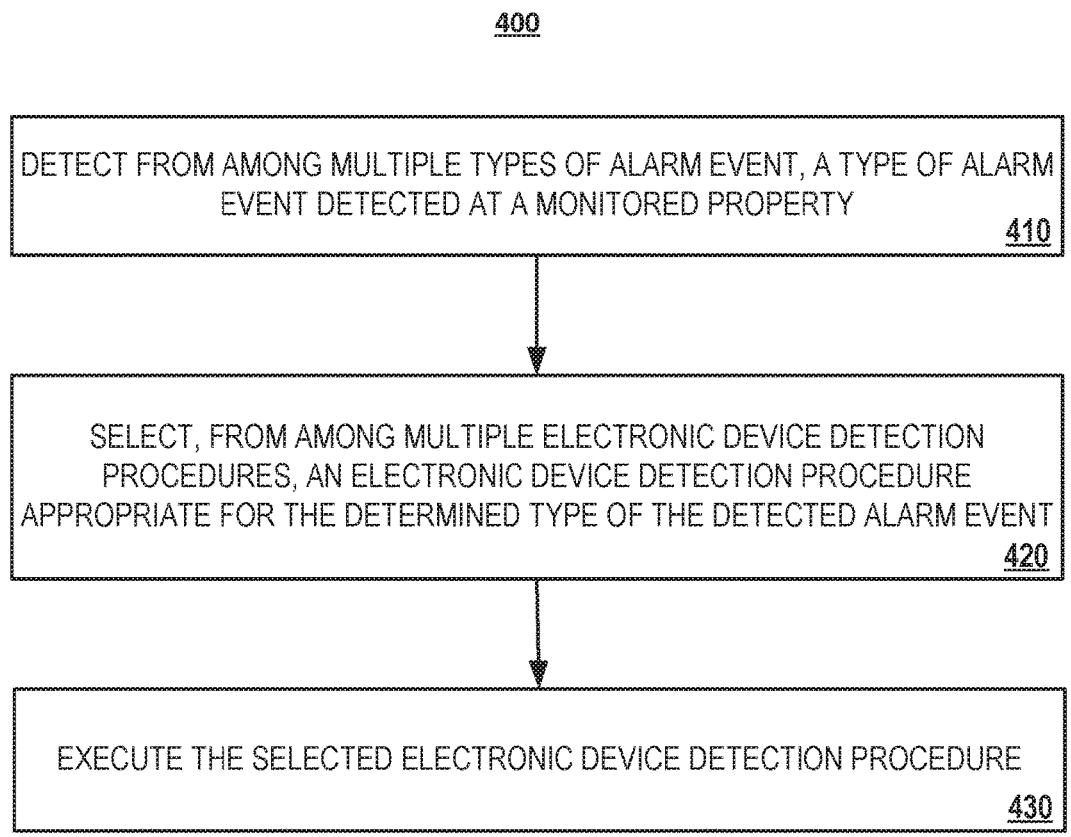

FIG. 4 illustrates an example process 400 for selecting an electronic device detection procedure appropriate for a determined type of detected alarm event. The system 100 detects, from among multiple types of alarm event, a type of alarm event detected at a monitored property (410). For example, the monitor control unit 110 may determine that a fire alarm event type is detected at a monitored property. In another example, the monitor control unit 110 may determine that a security breach alarm event type is detected at a monitored property.

The system 100 selects from among multiple electronic device detection procedures, an electronic device detection procedure appropriate for the determined type of the detected alarm event (420). For example, the monitor control unit 110 may select an electronic device detection procedure for a security breach alarm event type from multiple electronic device detection procedures including a procedure for a fire alarm event type, a procedure for a security breach alarm event type, a procedure for a water leak alarm event, and procedures for other alarm event types. The electronic device detection procedure for the fire alarm event type may describe that the system 100 should determine what household members may be in the monitored property based at least on mobile electronic devices detected within the property and notify the home owner of who may be in the monitored property. The electronic device detection procedure for the security breach alarm event may describe that the system 100 should determine whether unknown mobile electronic devices are in the monitored property and notify the home owner of any unknown mobile electronic devices detected within the monitored property.

The system executes the selected electronic device detection procedure (430). For example, in executing a selected electronic device detection procedure for an alarm event type of security breach, the monitor control unit 110 may determine what unknown mobile electronic devices may be in the monitored property and notify the home owner of what unknown mobile electronic devices are detected within the monitored property.

Figure 5:
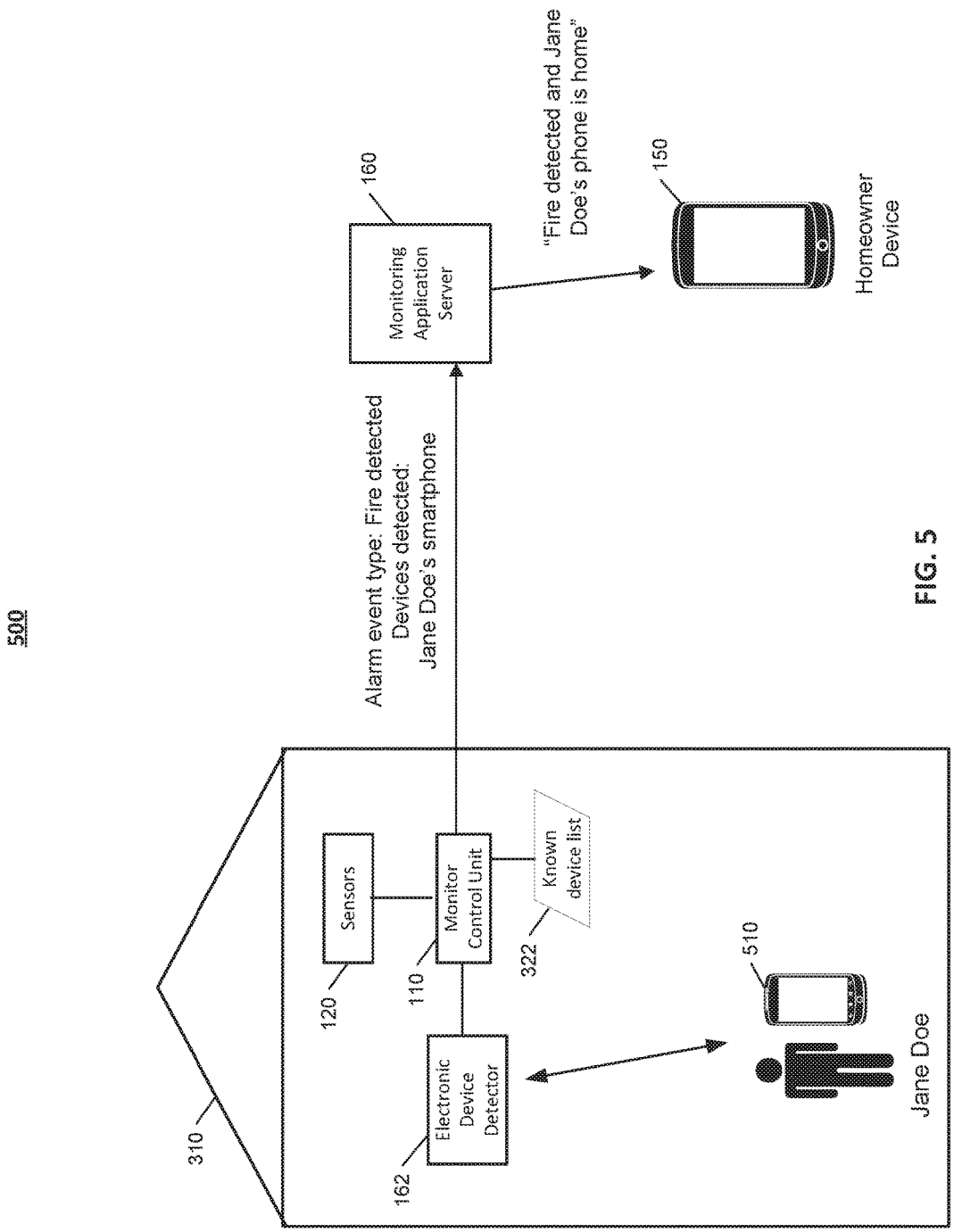

FIG. 5 illustrates an example system 500 for selecting an electronic device detection procedure appropriate for a determined type of detected alarm event. The monitor control unit 110 may determine an alarm event type of fire is detected and in response select, from multiple electronic device detection procedures, an electronic device detection procedure for the alarm event type of fire. The electronic device detection procedure for the alarm event type of fire may include determine the electronic identifiers for mobile electronic devices located within the monitored property at a time corresponding to the detected fire alarm event type, determine the electronic identifiers that are in a list of known electronic identifiers, determine users that are indicated in the list as associated with the known electronic identifiers, and provide a homeowner an alert indicating the fire alarm event and users that have mobile electronic devices detected within the monitored property when the fire alarm event was detected. According, the monitor control unit 110 may execute the electronic device detection procedure for the alarm event type of fire, determine that an electronic identifier for Jane Doe's mobile electronic device 510 is detected, determine that the electronic identifier for Jane Doe's mobile electronic device 510 is known and is associated with Jane Doe, and provide the monitoring application server 160 an indication that an alarm event type of fire was detected and that the only known mobile electronic device detect in the monitored property was Jane Doe's, e.g., provide a report that includes "Alarm event type: Fire detected; Devices detected: Jane Doe's smartphone." The monitoring application server 160 may then provide the homeowner device 150 an alert of "Fire detected and Jane Doe's phone is home."

Figure 6:
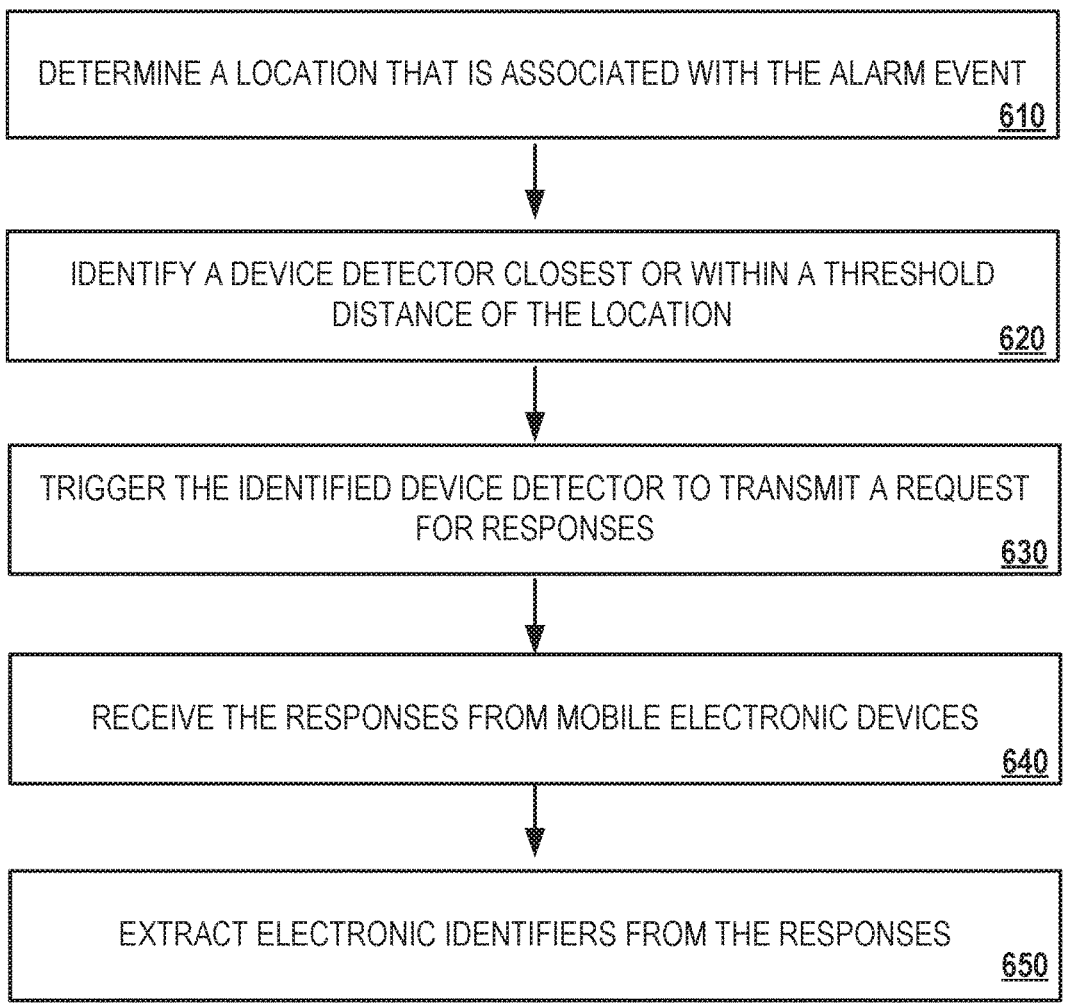

FIG. 6 illustrates an example process 600 for identifying device detectors to detect mobile electronic devices. The process 600 may be included in initiating a process to gather electronic identifiers (220) and determine electronic identifiers (230) as described above in relation to FIG. 2.

The system 100 determines a location that is associated with an alarm event (610). For example, the monitor control unit 110 may determine that an alarm event of security breach is associated with a location of a door that was sensed to be opened while the security system was armed. In another example, the monitor control unit 110 may determine that an alarm event of fire is associated with a location of a smoke sensor that sensed a high level of smoke corresponding to a fire.

The system 100 identifies a device detector closest or within a threshold distance of the determined location (620). For example, the monitor control unit 110 may determine that electronic device detector A is within a threshold distance, e.g., within twenty feet from the determined location, and in response identify electronic device detector A as within a threshold distance of the determined location.

The system 100 triggers the identified device detector to transmit a request for responses (630). For example, in response to identifying electronic device detector A, the monitor control unit 110 may instruct electronic device detector A to transmit a request for responses from all mobile electronic devices that receive the request from electronic device detector A.

The system 100 receives the responses from the mobile electronic devices (640). For example, the monitor control unit 110 may receive responses from electronic device detector A that electronic device detector A received from mobile electronic devices within the monitored property.

The system 100 extracts electronic identifiers from the responses (650). For example, for each response from a mobile electronic device, the monitor control unit 110 may extract an electronic identifier for the mobile electronic device that provided the response.

Figure 7:
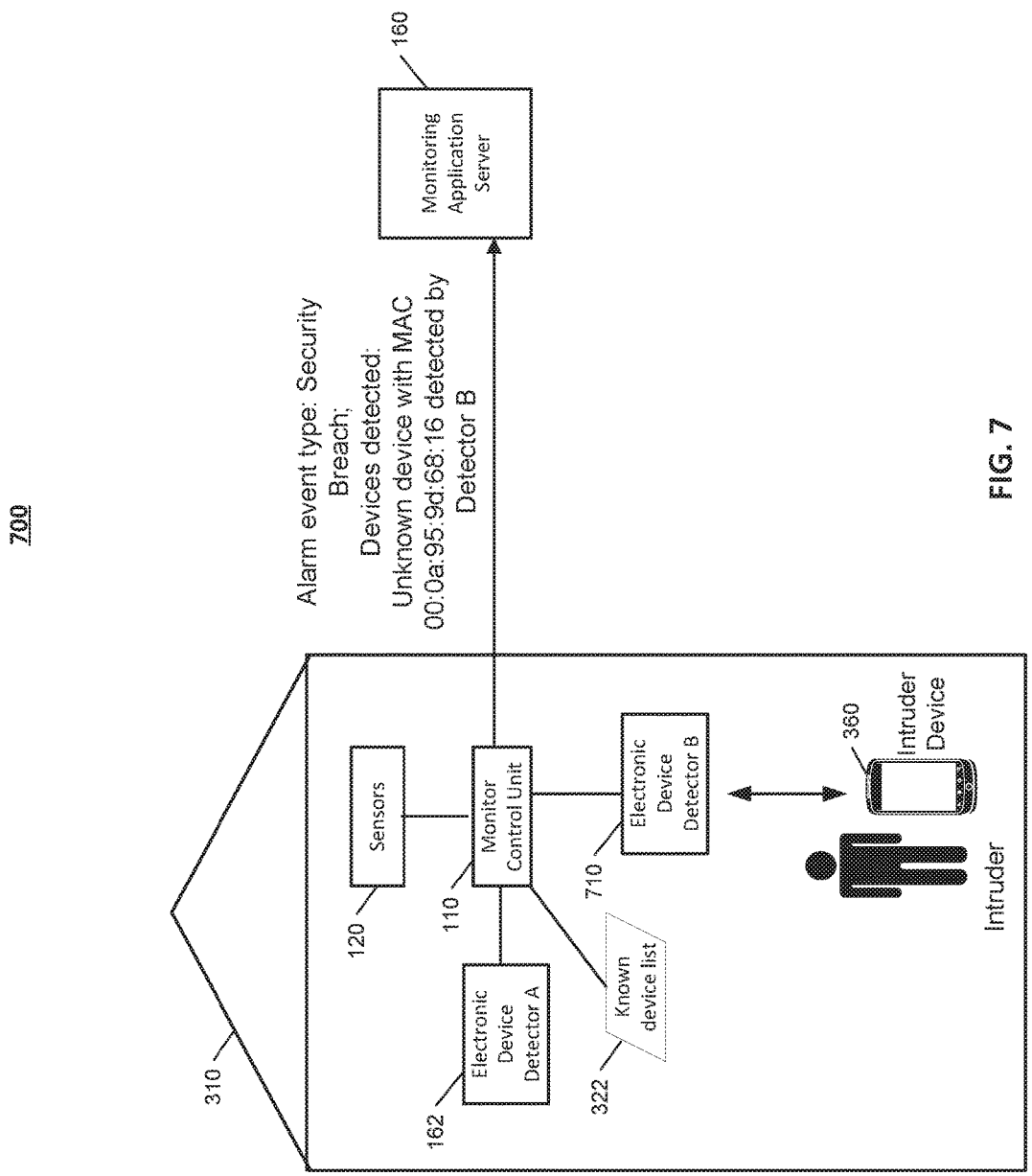

FIG. 7 illustrates an example system 700 for identifying device detectors to detect mobile electronic devices. The monitor control unit 110 may determine a location that is associated with an alarm event. For example, the monitor control unit 110 may detect an alarm event of a security breach type and in response determine that sensor data indicates that the security breach occurred near a particular part of a monitored property. The monitor control unit 110 may identify a device detector closest or within a threshold distance of the location. For example, the monitor control unit 110 may identify that electronic device detector A 162 and electronic device detector B 710 are both located within the monitored property and that electronic device detector B 710 is closest to the determined location. The monitor control unit 110 may trigger the identified device detector to transmit a request for responses. For example, in response to determining that electronic device detector B 710 is closest to the determined location, the monitor control unit 110 may provide an instruction to only electronic device detector B 710 to request responses that include electronic identifiers for all mobile electronic that receive the request. The monitor control unit 110 may receive the responses from the mobile electronic devices 640. For example, the intruder device 360 may provide a response that includes an electronic identifier of "00:0a:95:9d:68:16," and the electronic device detector B 710 may receive the response and provide the response to the monitor control unit 110. The monitor control unit 110 may extract electronic identifiers from the responses. For example, the monitor control unit 110 may extract the electronic identifier of "00:0a:95:9d:68:16" from the response of the intruder device 360.

Figure 8:
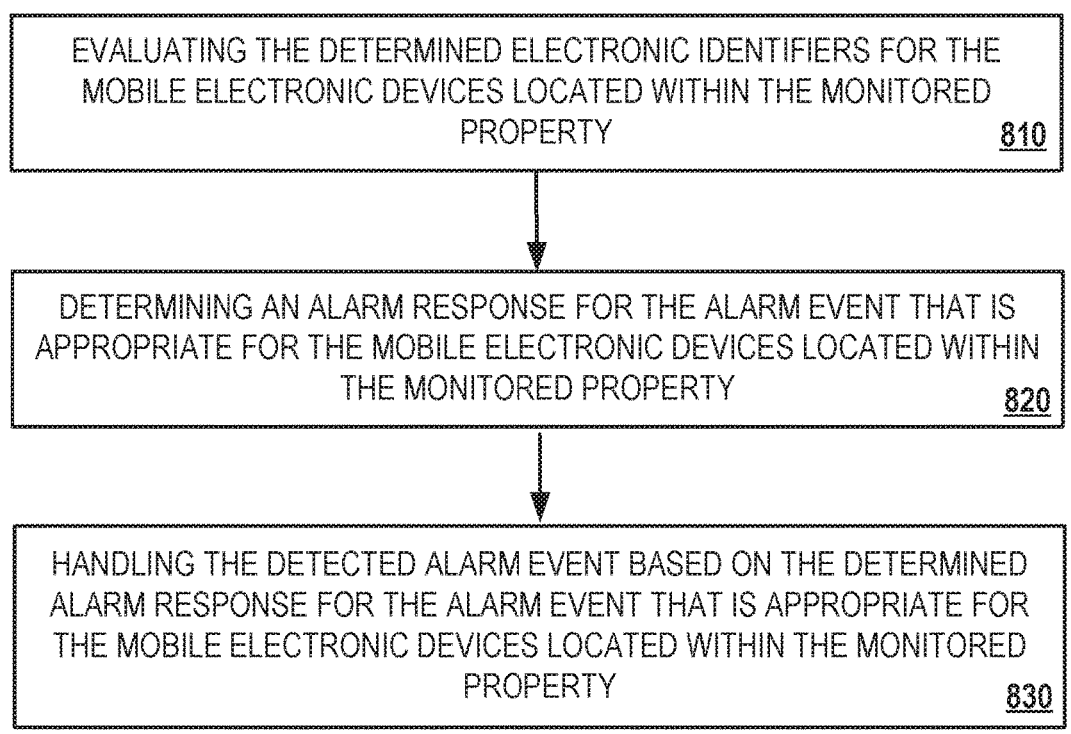

FIG. 8 illustrates an example process 800 for determining an alarm response appropriate for mobile electronic devices located within a monitored property. The system 100 evaluates the determined electronic identifiers for the mobile electronic devices located within the monitored property (810). For example, the monitor control unit 110 may identifier whether electronic identifiers for mobile electronic devices located within the monitored property at a time corresponding to a detected alarm event are associated with known mobile electronic devices or associated with unknown mobile electronic devices.

The system 100 determines an alarm response for the alarm event that is appropriate for the mobile electronic devices located within the monitored property (820). For example, the monitor control unit 110 may determine that the alarm type is a security breach and that an unknown mobile electronic device is detected within the monitored property. In another example, the monitor control unit 110 may determine that the alarm type is a security breach and that no unknown mobile electronic devices are detected within the monitored property. In yet another example, the monitor control unit 110 may determine that the alarm type is fire and that known mobile electronic devices are detected within the monitored property.

The system 100 handles the detected alarm event based on the determined alarm response for the alarm event that is appropriate for the mobile electronic devices located within the monitored property (830). For example, in response to determining that the alarm type is a security breach and that an unknown mobile electronic device is detected within the monitored property, the monitor control unit 110 may instruct a camera to record a location associated with the security breach. In another example, in response to determining that the alarm type is fire and that known mobile electronic devices are detected within the monitored property, the monitoring control unit 110 may determine to provide an alert of the fire to all the known mobile electronic devices detected within the monitored property and notify a homeowner that the users of the known mobile electronic devices may be in danger from the fire as their mobile electronic devices are within the monitored property so the users may be in the monitored property.

Figure 9:
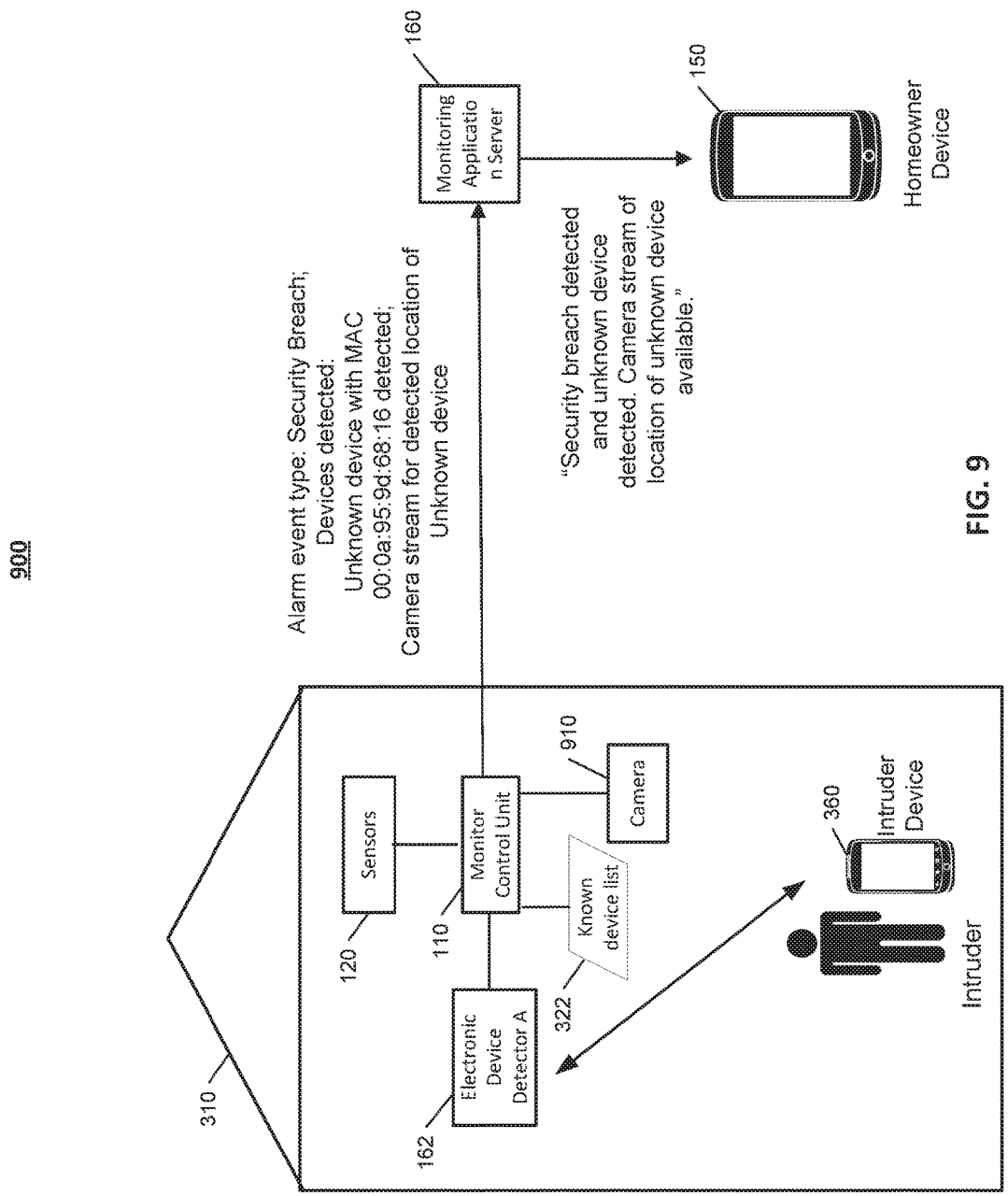

FIG. 9 illustrates an example system 900 for determining an alarm response appropriate for mobile electronic devices located within a monitored property. The monitor control unit 110 may evaluate the determined electronic identifiers for the mobile electronic devices located within the monitored property. For example, the monitor control unit 110 may evaluate an electronic identifier extracted from a response of the intruder device 360 and determine that the electronic identifier corresponds to an unknown mobile electronic device as the electronic identifier does not correspond to an electronic identifier in a list of known electronic identifiers. The monitor control unit 110 may determine an alarm response for the alarm event that is appropriate for the mobile electronic devices located within the monitored property. For example, the monitor control unit 110 may determine that the alarm event is of a type of security breach and that an unknown mobile electronic device is detected, and in response, determine to trigger a camera 910 to record a location. The monitor control unit 110 may handle the detected alarm event based on the determined alarm response for the alarm event that is appropriate for the mobile electronic devices located within the monitored property. For example, the monitor control unit 110 may provide information to the monitoring application server 160 that includes "Alarm event type: Security Breach; Devices detected: Unknown device with MAC 00:0a:95:9d:68:16; Camera stream for detected location of Unknown device." The monitoring application server 160 may then provide an alert to the homeowner device 150. The alert may include "Security breach detected and unknown device detected. Camera stream of location of unknown device available."

Figure 10:
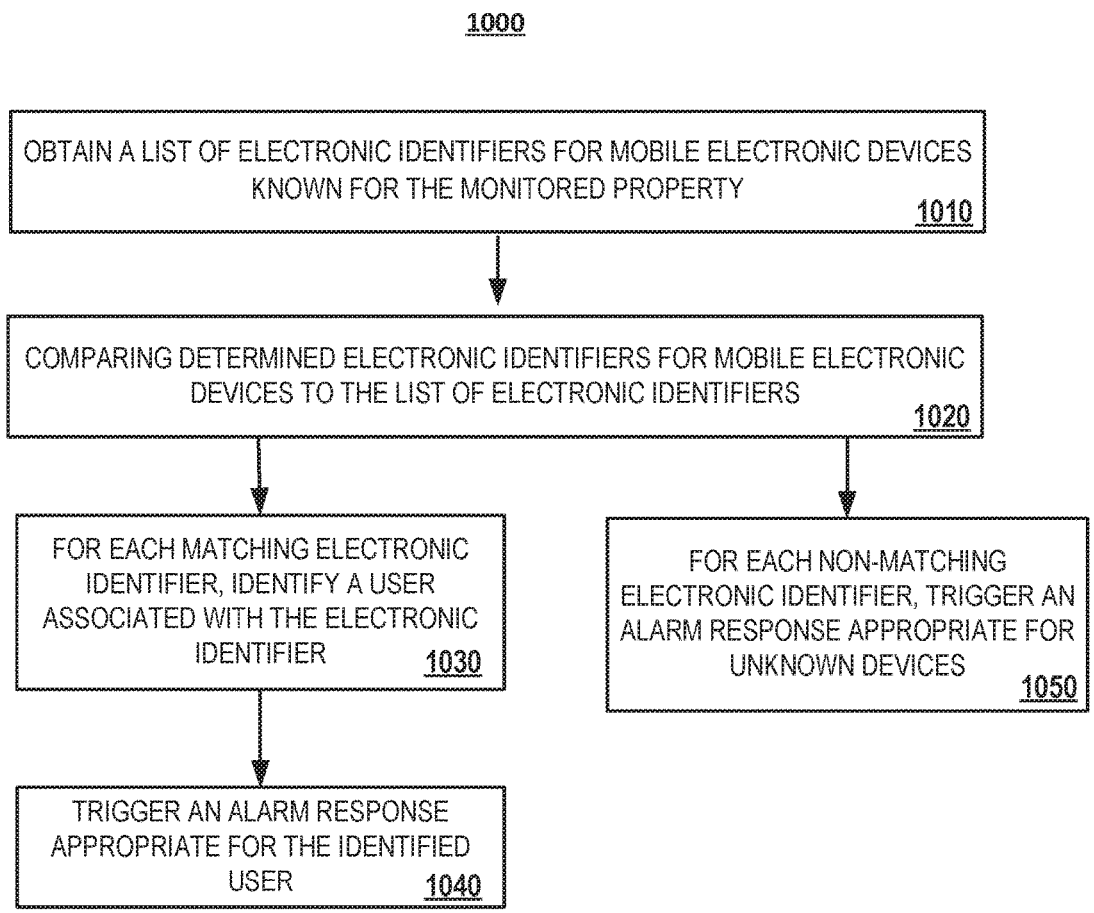

FIG. 10 illustrates an example process 1000 for triggering an appropriate alarm response based on determined electronic identifiers of mobile electronic devices. The system 100 obtains a list of electronic identifiers for mobile electronic devices known for the monitored property (1010). For example, the monitor control unit 110 may access a stored list of known devices that are associated with the monitored property.

The system 100 compares determined electronic identifiers for mobile electronic devices to the list of electronic identifiers (1020). For example, for each electronic identifier for a mobile electronic device determined to be within the monitored property at a time corresponding to the alarm event, the monitor control unit 110 may determine whether the electronic identifier matches an electronic identifier in the access list of known devices that are associated with the monitored property.

For each matching electronic identifier, the system 100 identifies a user associated with the electronic identifier (1030). For example, the monitor control unit 110 may determine that an electronic identifier matches an electronic identifier for a known mobile electronic device and may determine that the stored list indicates that the known mobile electronic device is associated with Jane Doe.

The system 100 triggers an alarm response appropriate for the identified user (1040). For example, the monitor control unit 110 may provide an alert to Jane Doe's device that a fire is detected in the monitored property or that an intruder is detected within the monitored property, or provide an alert to a device of the homeowner that Jane Doe's device is within the monitored property and a fire is detected.

For each non-matching electronic identifier, the system 100 triggers an alarm response appropriate for unknown devices (1050). For example, the monitor control unit 110 may trigger a camera to record a location associated with an unknown mobile electronic device and provide an alert to a homeowner indicating the electronic identifier of the unknown mobile electronic device and including a video recording of the location associated with the unknown mobile electronic device.

Figure 11:
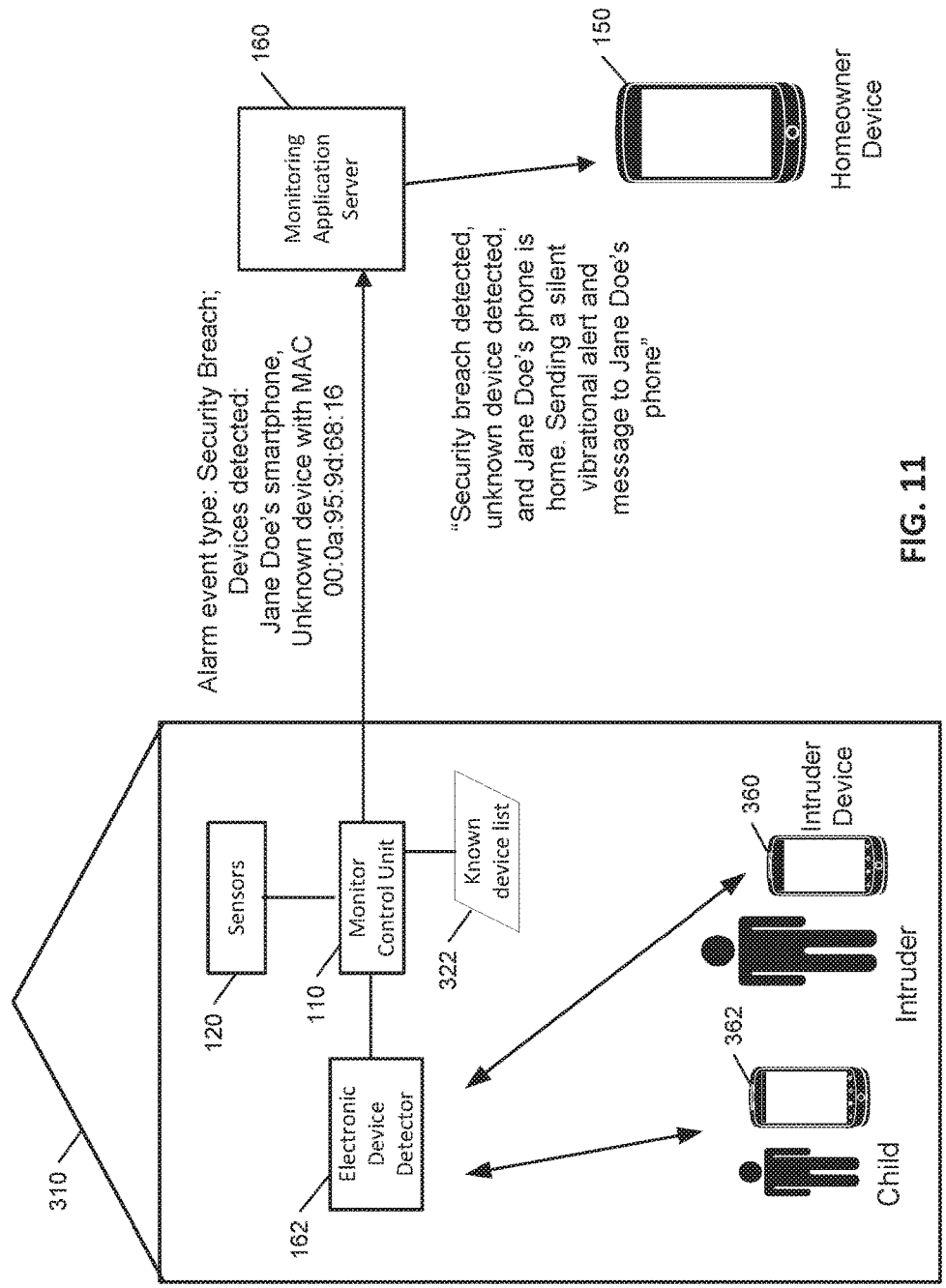

FIG. 11 illustrates an example system 1100 for triggering an appropriate alarm response based on determined electronic identifiers of mobile electronic devices. The monitor control unit may obtain a list of electronic identifiers for mobile electronic devices known for the monitored property. For example, the monitor control unit 110 may access the known device list 322 that indicates that Jane Doe's and the home owner's mobile electronic devices are known to be associated with the monitored property. The monitor control unit 110 may compare determined electronic identifiers for mobile electronic devices to the list of electronic identifiers. For example, the monitor control unit 110 may determine a MAC of 00:0a:95:9d:68:16 from the intruder's device 360 and a MAC of 11:11:11:11:11:11 from a homeowner's child's device to the list of electronic identifiers. For each non-matching electronic identifier, the monitor control unit 110 may trigger an alarm response appropriate for the unknown device and for each matching electronic identifier, the monitor control unit 110 may trigger an alarm response appropriate for the known device. For example, the monitor control unit 110 may determine that the MAC of 00:0a:95:9d:68:16 does not match the MAC of any electronic identifier in the list but that the MAC of 11:11:11:11:11:11 is associated with a mobile electronic device of the child of the homeowner, and in response, trigger an alert to the homeowner that an unknown device with the MAC of 00:0a:95:9d:68:16 is detected within the monitored property and the homeowner's child's mobile device is also detected within the monitored property, e.g., an alert of "Security breath detected, unknown device detected, and Jane Doe's phone is home. Sending a silent vibrational alert and message to Jane Doe's phone," and trigger an alert to the known mobile electronic device, e.g., a silent vibrational alert and message that there is an intruder.

Figure 12:
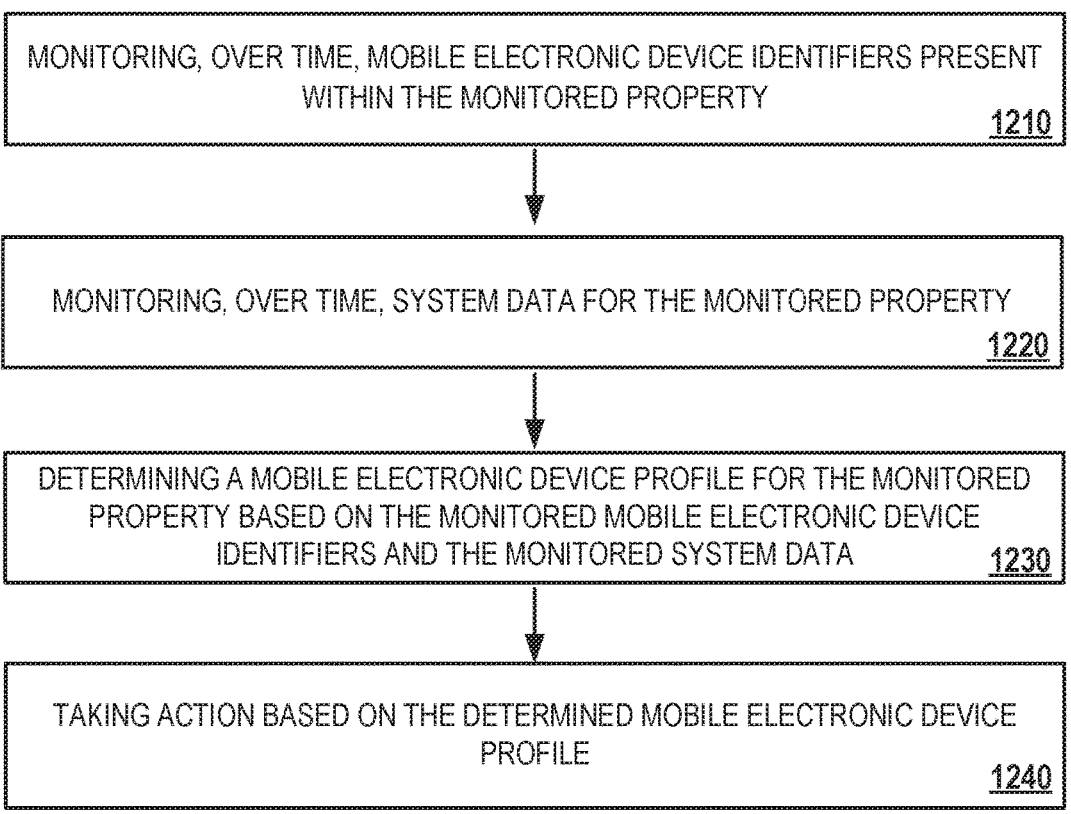

FIG. 12 illustrates an example process 1200 for taking action based on a determined mobile electronic device profile. The system 100 monitors, over time, mobile electronic device identifiers present within the monitored property (1210). For example, the monitor control unit 110 may monitor when electronic identifiers are detected for mobile electronic devices within the monitored property across hours, days, weeks, or months, or other time periods, and store information indicating when the electronic identifiers were detected.

The system 100 monitors, over time, system data for the monitored property (1220). For example, the monitor control unit 110 may monitor sensor data and alarm event types across hours, days, weeks, months, or other time periods, and store information indicating the system data.

The system 100 determines a mobile electronic device profile for the monitored property based on the monitored mobile electronic device identifiers and the monitored system data (1230). For example, the monitor control unit 110 may determine a profile that describes what mobile electronic device identifiers are frequently detected for what monitored system data.

The system 100 takes action based on the determined mobile electronic device profile (1240). For example, the monitor control unit 110 may determine that an electronic identifier not frequently detected at a particular time of day is being detected at the particular time of day, and in response, generate an alert to a homeowner. In another example, the monitor control unit 110 may determine that an electronic identifier that is frequently detected for a particular day is not detected for the particular day, and in response, generate an alert to a homeowner.

Figure 13:
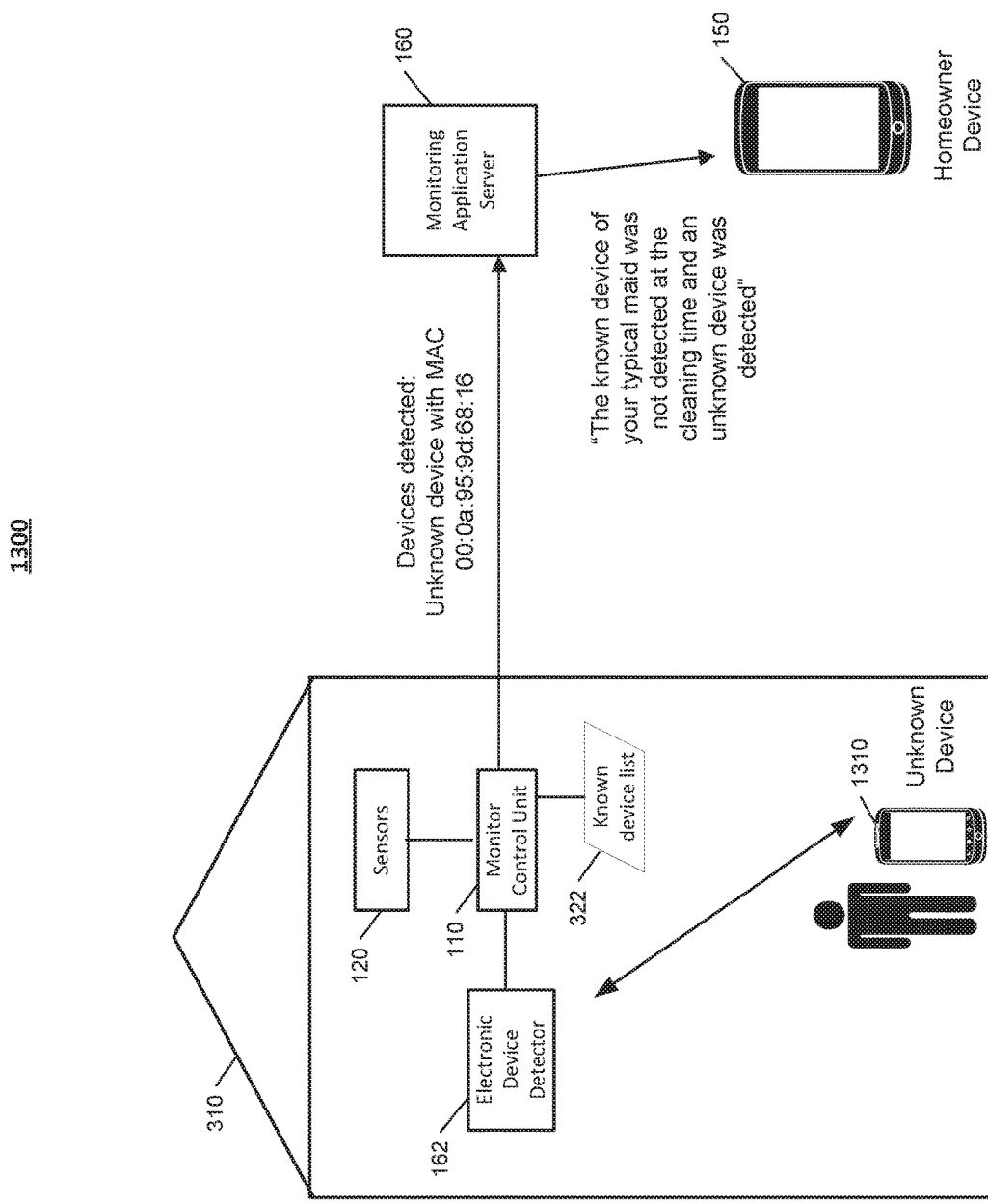

FIG. 13 illustrates an example system 1300 for taking action based on a determined mobile electronic device profile. The monitor control unit 110 may monitor detected electronic identifiers and system data, and in response, generate a mobile electronic device profile that describes an electronic identifier of a maid's mobile electronic device is typically detected between 2-3 PM on Monday. The monitor control unit 110 may determine using the mobile electronic device profile that the maid's mobile electronic device is not detected at 2 PM on Monday and an electronic identifier of an unknown mobile electronic device is detected, and in response, provide information to the monitoring application server 160 indicating "Devices detected: Unknown device with MAC 00:0a:95:9d:68:16." In response, the monitoring application server 160 may provide an alert of "The known device of your typical maid was not detected at the cleaning time and an unknown device was detected" to the homeowner device 150.

FIG. 14 illustrates an example system 1400 for taking action based on a determined mobile electronic device profile. The monitor control unit 110 may monitor detected electronic identifiers and system data, and in response, generate a mobile electronic device profile that describes an electronic identifier of Jane Doe's mobile electronic device is typically not detected between 10-4 PM on weekdays. The monitor control unit 110 may determine using the mobile electronic device profile that Jane Doe's mobile electronic device is detected at 11 AM on Monday, and in response, provide information to the monitoring application server 160 indicating "Devices detected: Jane Doe's smartphone." In response, the monitoring application server 160 may provide an alert of "Jane Doe's smartphone is home and usually it is not at this time" to the homeowner device 150.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
monitoring, by a server, mobile electronic device identifiers comprising media access control (MAC) addresses associated with mobile electronic devices present within the monitored property;
receiving, by the server and from one or more sensors in the monitored property, system data for the monitored property;
generating, by the server, a profile for the monitored property based on the monitored mobile electronic device identifiers and the monitored system data, the profile comprising data indicative of one or more MAC addresses associated with mobile electronic devices that are detected in the monitored property equal to or more than a threshold number of times during a particular time period;
determining, based on the profile, whether a particular MAC address of a particular device detected during the particular time period corresponds to the one or more MAC addresses associated with mobile electronic devices that are detected in the monitored property equal to or more than the threshold number of times during the particular time period; and
in response to determining that the particular MAC address of the particular device detected during the particular time period does not correspond to the one or more MAC addresses associated with mobile electronic devices that are detected in the monitored property equal to or more than the threshold number of times during the particular time period, transmitting an alert message to a device of a user associated with the monitored property, the alert message comprising data indicative of the particular MAC address and the particular time period.

2. The method of claim 1, wherein the monitored system data comprises one or more of system status data or sensor data.

3. The method of claim 1, wherein determining whether the particular MAC address of the particular device detected during the particular time period corresponds to the one or more MAC addresses comprises:
identifying MAC addresses for mobile electronic devices frequently detected within the monitored property and providing an alert when a MAC address not associated with the mobile electronic devices frequently detected within the monitored property is detected within the monitored property.

4. The method of claim 1, wherein monitoring mobile electronic device identifiers present within the monitored property comprises:
monitoring when electronic identifiers are detected for mobile electronic devices within the monitored property across time periods of hours, days, weeks, and months; and
storing information indicating the time periods when the electronic identifiers were detected within the monitored property.

5. The method of claim 1, wherein receiving system data for the monitored property comprises:
receiving sensor data and data indicative of alarm event types detected at the monitored property across time periods of hours, days, weeks, and months; and
storing information indicating the time periods corresponding to the sensor data and the data indicative of alarm event types.

6. The method of claim 1, wherein determining whether the particular MAC address of the particular device detected during the particular time period corresponds to the one or more MAC addresses comprises:
determining that a MAC address not frequently detected at a particular time of day is being detected at the particular time of day; and
in response to the determination that the MAC address not frequently detected at the particular time of day is being detected at the particular time of day, generating an alert for the user associated with the monitored property.

7. The method of claim 1, wherein determining whether the particular MAC address of the particular device detected during the particular time period corresponds to the one or more MAC addresses comprises:
determining that a MAC address that is frequently detected for a particular day is not detected for the particular day; and
in response to the determination that the MAC address that is frequently detected for the particular day is not detected for the particular day, generating an alert for the user associated with the monitored property.

8. The method of claim 1:
wherein monitoring the mobile electronic device identifiers associated with mobile electronic devices that are present within the monitored property comprises monitoring for electronic device identifiers associated with mobile electronic devices that are present within the monitored property over particular time ranges on particular days of a week;
wherein receiving system data for the monitored property comprises receiving sensor data captured at the monitored property over the particular time ranges on the particular days of a week;
wherein generating a profile for the monitored property based on the monitored mobile electronic device identifiers and the monitored system data comprises generating the profile for the monitored property that indicates that a second mobile electronic device associated with a second electronic device identifier is detected within the monitored property during a particular time range on a particular day of the week equal to or more than the threshold number of times; and
wherein determining whether the particular MAC address of the particular device detected during the particular time period corresponds to the one or more MAC addresses comprises:
determining, based on the profile, that the second mobile electronic device associated with the second electronic device identifier is not detected at the monitored property during the particular time range on the particular day of the week and that an unknown electronic device identifier of an unknown mobile electronic device is detected at the monitored property during the particular time range on the particular day of the week; and based on the determination that the second mobile electronic device associated with the second electronic device identifier is not detected at the monitored property during the particular time range on the particular day of the week and that the unknown electronic device identifier of the unknown mobile electronic device is detected at the monitored property during the particular time range on the particular day of the week, providing, to the device of the user associated with the monitored property, an alert that indicates that, during the particular time range on the particular day of the week, the second mobile electronic device associated with the second electronic device identifier was not detected at the monitored property and that the unknown mobile electronic device with the unknown electronic device identifier was detected at the monitored property.

9. The method of claim 1:

wherein monitoring the mobile electronic device identifiers associated with mobile electronic devices that are present within the monitored property comprises monitoring for electronic device identifiers associated with mobile electronic devices that are present within the monitored property over particular time ranges on particular days of a week;

wherein receiving system data for the monitored property comprises receiving sensor data captured at the monitored property over the particular time ranges on the particular days of a week;

wherein generating a profile for the monitored property based on the monitored mobile electronic device identifiers and the monitored system data comprises generating the profile for the monitored property that indicates that a second mobile electronic device associated with a second electronic device identifier is detected within the monitored property during a particular time range on a particular day of the week less than the threshold number of times; and wherein determining whether the particular MAC address of the particular device detected during the particular time period corresponds to the one or more MAC addresses comprises:

determining, based on the profile, that the second mobile electronic device associated with the second electronic device identifier is detected at the monitored property during the particular time range on the particular day of the week; and based on the determination that the second mobile electronic device associated with the second electronic device identifier is detected at the monitored property during the particular time range on the particular day of the week, providing, to the device of the user associated with the monitored property, an alert that indicates that the second mobile electronic device associated with the second electronic device identifier is detected at the monitored property during the particular time range on the particular day of the week and that the second mobile electronic device associated with the second electronic device identifier is typically not detected at the monitored property during the particular time range on the particular day of the week.

10. The method of claim 1, further comprising configuring one or more electronic device detectors to:

spoof a trusted wireless device or trusted wireless network; and transmit one or more requests for device identification information to electronic devices located in the monitored property.

11. A system comprising:

one or more computers; and one or more storage devices storing instructions that are operable, when executed by the one or more computers, to cause the one or more computers to perform operations comprising:

monitoring mobile electronic device identifiers comprising media access control (MAC) addresses associated with mobile electronic devices present within the monitored property;

receiving, from one or more sensors in the monitored property, system data for the monitored property;

generating a profile for the monitored property based on the monitored mobile electronic device identifiers and the monitored system data, the profile comprising data indicative of one or more MAC addresses associated with mobile electronic devices that are detected in the monitored property equal to or more than a threshold number of times during a particular time period;

determining, based on the profile, whether a particular MAC address of a particular device detected during the particular time period corresponds to the one or more MAC addresses associated with mobile electronic devices that are detected in the monitored property equal to or more than the threshold number of times during the particular time period; and in response to determining that the particular MAC address of the particular device detected during the particular time period does not correspond to the one or more MAC addresses associated with mobile electronic devices that are detected in the monitored property equal to or more than the threshold number of times during the particular time period, transmitting an alert message to a device of a user associated with the monitored property, the alert message comprising data indicative of the particular MAC address and the particular time period.

12. The system of claim 11, wherein the monitored system data comprises one or more of system status data or sensor data.

13. The system of claim 11, wherein determining whether the particular MAC address of the particular device detected during the particular time period corresponds to the one or more MAC addresses comprises:

identifying MAC addresses for mobile electronic devices frequently detected within the monitored property and providing an alert when a MAC address not associated with the mobile electronic devices frequently detected within the monitored property is detected within the monitored property.

14. The system of claim 11, wherein monitoring mobile electronic device identifiers present within the monitored property comprises:

monitoring when electronic identifiers are detected for mobile electronic devices within the monitored property across time periods of hours, days, weeks, and months; and storing information indicating the time periods when the electronic identifiers were detected within the monitored property.

15. The system of claim 11, wherein receiving system data for the monitored property comprises:
  receiving sensor data and data indicative of alarm event types detected at the monitored property across time periods of hours, days, weeks, and months; and
  storing information indicating the time periods corresponding to the sensor data and the data indicative of alarm event types.

16. The system of claim 11, wherein determining whether the particular MAC address of the particular device detected during the particular time period corresponds to the one or more MAC addresses comprises:
  determining that a MAC address not frequently detected at a particular time of day is being detected at the particular time of day; and
  in response to the determination that the MAC address not frequently detected at the particular time of day is being detected at the particular time of day, generating an alert for the user associated with the monitored property.

17. The system of claim 11, wherein determining whether the particular MAC address of the particular device detected during the particular time period corresponds to the one or more MAC addresses comprises:
  determining that a MAC address that is frequently detected for a particular day is not detected for the particular day; and
  in response to the determination that the MAC address that is frequently detected for the particular day is not detected for the particular day, generating an alert for the user associated with the monitored property.

18. The system of claim 11:
  wherein monitoring the mobile electronic device identifiers associated with mobile electronic devices that are present within the monitored property comprises monitoring for electronic device identifiers associated with mobile electronic devices that are present within the monitored property over particular time ranges on particular days of a week;
  wherein receiving system data for the monitored property comprises receiving sensor data captured at the monitored property over the particular time ranges on the particular days of a week;
  wherein generating a profile for the monitored property based on the monitored mobile electronic device identifiers and the monitored system data comprises generating the profile for the monitored property that indicates that a second mobile electronic device associated with a second electronic device identifier is detected within the monitored property during a particular time range on a particular day of the week equal to or more than the threshold number of times; and
  wherein determining whether the particular MAC address of the particular device detected during the particular time period corresponds to the one or more MAC addresses comprises:
    determining, based on the profile, that the second mobile electronic device associated with the second electronic device identifier is not detected at the monitored property during the particular time range on the particular day of the week and that an unknown electronic device identifier of an unknown mobile electronic device is detected at the monitored property during the particular time range on the particular day of the week; and
    based on the determination that the second mobile electronic device associated with the second electronic device identifier is not detected at the monitored property during the particular time range on the particular day of the week and that the unknown electronic device identifier of the unknown mobile electronic device is detected at the monitored property during the particular time range on the particular day of the week, providing, to the device of the user associated with the monitored property, an alert that indicates that, during the particular time range on the particular day of the week, the second mobile electronic device associated with the second electronic device identifier was not detected at the monitored property and that the unknown mobile electronic device with the unknown electronic device identifier was detected at the monitored property.

19. The system of claim 11:
  wherein monitoring the mobile electronic device identifiers associated with mobile electronic devices that are present within the monitored property comprises monitoring for electronic device identifiers associated with mobile electronic devices that are present within the monitored property over particular time ranges on particular days of a week;
  wherein receiving system data for the monitored property comprises receiving sensor data captured at the monitored property over the particular time ranges on the particular days of a week;
  wherein generating a profile for the monitored property based on the monitored mobile electronic device identifiers and the monitored system data comprises generating the profile for the monitored property that indicates that a second mobile electronic device associated with a second electronic device identifier is detected within the monitored property during a particular time range on a particular day of the week less than the threshold number of times; and
  wherein determining whether the particular MAC address of the particular device detected during the particular time period corresponds to the one or more MAC addresses comprises:
    determining, based on the profile, that the second mobile electronic device associated with the second electronic device identifier is detected at the monitored property during the particular time range on the particular day of the week; and
    based on the determination that the second mobile electronic device associated with the second electronic device identifier is detected at the monitored property during the particular time range on the particular day of the week, providing, to the device of the user associated with the monitored property, an alert that indicates that the second mobile electronic device associated with the second electronic device identifier is detected at the monitored property during the particular time range on the particular day of the week and that the second mobile electronic device associated with the second electronic device identifier is typically not detected at the monitored property during the particular time range on the particular day of the week.

20. The system of claim 11, wherein the operations further comprise configuring one or more electronic device detectors to:
  spoof a trusted wireless device or trusted wireless network; and transmit one or more requests for device identification information to electronic devices located in the monitored property.

\* \* \* \* \*

UNITED STATES PATENT AND TRADEMARK OFFICE
CERTIFICATE OF CORRECTION

PATENT NO. : 9,972,185 B2
APPLICATION NO. : 15/344863
DATED : May 15, 2018
INVENTOR(S) : Hutz Page 1 of 1

It is certified that error appears in the above-identified patent and that said Letters Patent is hereby corrected as shown below:

On the Title Page

Column 1 (Notice), Line 3, after "0 days." delete "days.".

In the Specification

Column 1, Line 6 (Approx.), delete "continuation" and insert -- divisional --, therefor.

Signed and Sealed this
Second Day of October, 2018

Andrei Iancu
*Director of the United States Patent and Trademark Office*